US008605321B2

(12) United States Patent
Nakai et al.

(10) Patent No.: US 8,605,321 B2
(45) Date of Patent: Dec. 10, 2013

(54) MANAGING DEVICE, PRINT PROCESSING SYSTEM, MANAGING DEVICE CONTROL METHOD, MANAGING DEVICE CONTROL COMPUTER PROGRAM AND STORAGE MEDIUM CONTAINING MANAGING DEVICE CONTROL COMPUTER PROGRAM

(75) Inventors: Yoshiyuki Nakai, Nara (JP); Yohichi Shimazawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1800 days.

(21) Appl. No.: 11/296,600

(22) Filed: Dec. 6, 2005

(65) Prior Publication Data
US 2006/0119879 A1 Jun. 8, 2006

(30) Foreign Application Priority Data
Dec. 6, 2004 (JP) .................. 2004-353076

(51) Int. Cl.
*G06F 15/00* (2006.01)
*G06F 3/12* (2006.01)
*G06K 1/00* (2006.01)
*G06K 15/00* (2006.01)
*H04N 1/40* (2006.01)

(52) U.S. Cl.
USPC ........... 358/1.18; 358/1.9; 358/2.1; 358/1.16; 358/1.15; 358/1.13

(58) Field of Classification Search
USPC .......... 358/1.11–1.18, 448, 470, 296, 1.9, 2.1
See application file for complete search history.

(56) References Cited

U.S. PATENT DOCUMENTS

| 5,444,518 | A  | * | 8/1995  | Hashiguchi et al. | 399/271 |
| 5,694,485 | A  | * | 12/1997 | Shoji             | 382/190 |
| 5,974,548 | A  | * | 10/1999 | Adams             | 713/186 |
| 6,014,462 | A  | * | 1/2000  | Yamakawa          | 382/200 |
| 6,313,924 | B2 | * | 11/2001 | Kanamori          | 358/1.9 |
| 6,351,815 | B1 | * | 2/2002  | Adams             | 726/32  |
| 6,389,163 | B1 | * | 5/2002  | Jodoin et al.     | 382/173 |
| 6,561,643 | B1 | * | 5/2003  | Walker et al.     | 347/105 |
| 6,585,341 | B1 | * | 7/2003  | Walker et al.     | 347/14  |
| 6,599,226 | B2 | * | 7/2003  | Asai et al.       | 493/321 |
| 6,744,905 | B1 | * | 6/2004  | Horiike           | 382/100 |

(Continued)

FOREIGN PATENT DOCUMENTS

| JP | 2002-271625 | 9/2002 |
| JP | 2002-281310 | 9/2002 |
| JP | 2004-112052 | 4/2004 |

*Primary Examiner* — Twyler Haskins
*Assistant Examiner* — Jonathan Beckley
(74) *Attorney, Agent, or Firm* — Edwards Wildman Palmer LLP; David G. Conlin; Steven M. Jensen

(57) ABSTRACT

A printer control processing device manages a result of the image capturing of the symbol pattern indicating information based on which a print process is controlled. The printer control processing device includes: a recording/retrieving section for obtaining reference pattern data and pattern printing data from an information storage section; a matching level determining section for determining a matching level between reference pattern data and the result of the image capturing by an image capturing device of a symbol pattern printed based on the pattern printing data; and a pattern modifying section modifying the pattern printing data corresponding to a captured symbol pattern if the matching level determining section determines that the matching level is less than a predetermined threshold. Therefore, pattern printing data can be provided which results in a reliably identifiable symbol pattern in the result the image capturing by the image capturing device.

9 Claims, 21 Drawing Sheets

(56) References Cited

U.S. PATENT DOCUMENTS

| | | | |
|---|---|---|---|
| 6,813,385 B2 * | 11/2004 | Ideyama | 382/232 |
| 7,085,012 B2 * | 8/2006 | Schweid et al. | 358/2.1 |
| 7,113,615 B2 * | 9/2006 | Rhoads et al. | 382/100 |
| 7,123,851 B2 * | 10/2006 | Tomita et al. | 399/49 |
| 7,139,087 B2 * | 11/2006 | Hayashi | 358/1.15 |
| 7,286,684 B2 * | 10/2007 | Rhoads et al. | 382/100 |
| 7,298,528 B2 * | 11/2007 | Nagashima | 358/3.28 |
| 7,456,983 B2 * | 11/2008 | Meador et al. | 358/1.14 |
| 7,529,006 B2 * | 5/2009 | Itagaki et al. | 358/519 |
| 7,639,377 B2 * | 12/2009 | Aihara et al. | 358/1.13 |
| 2005/0002054 A1 * | 1/2005 | Shoji et al. | 358/1.14 |

\* cited by examiner

FIG. 6

| 2004 3/5 | 2004 5/7 | ... | 2004 10/27 | 2004 12/8 |
|---|---|---|---|---|
| 90% | 91% | ... | 89% | 90% |

FIG. 7

| | TRAY a | * |
|---|---|---|
| * | TRAY b | * |
| | TRAY c | * |

FIG. 16

|   |         |   |     |   |   |
|---|---------|---|-----|---|---|
|   | TRAY a  | * | ... | * | * |
| * | TRAY b  | * | ... | * | * |
|   | TRAY c  | * | ... | * | * |

FIG. 18

| | |
|---|---|
| ∗ | COPY PROHIBITED |
| ▽ | SECONDARY COPYING PROHIBITED |
| ● | COPY ALLOWED |

INPUT
LAYER

INTERMEDIATE
LAYER

OUTPUT
LAYER

FIG. 21

Minutes of new product schedule promotion meeting (for in-house use only)

1. Date and time: 20.7.2004, 10:30 TO 12:00
2. Place: Meeting room 8-73
3. Subject: Current issues and strategies
4. Details:
   Our strategies in view of competitors' new products
   XXX function of XXX Co., reviewed by Planning Sect.
   Effect of incorporation of XXX function on schedule, presented by Tech. Sect.
       in relation to mechanism
       in relation to hardware
       in relation to software
   Effect on price, by Procurement Sect.
   Conclusion by Operation Div. Mngr.
       No change allowed in...
       No delay in schedule
       No compromise in quality

CONFIDENTIAL

MANAGING DEVICE, PRINT PROCESSING SYSTEM, MANAGING DEVICE CONTROL METHOD, MANAGING DEVICE CONTROL COMPUTER PROGRAM AND STORAGE MEDIUM CONTAINING MANAGING DEVICE CONTROL COMPUTER PROGRAM

This nonprovisional application claims priority under 35 U.S.C. §119(a) on Patent Application No. 2004-353076 filed in Japan on Dec. 6, 2004, the entire contents of which are hereby incorporated by reference.

FIELD OF THE INVENTION

The present invention relates to a managing device which manages results of image capturing of a pattern by an image capturing device. Based on the pattern, information provided to a printed material to control a print process in a print processing device is identified. The invention also relates to an associated print processing system, managing device control method, managing device control computer program, and storage medium containing the managing device control computer program.

BACKGROUND OF THE INVENTION

Traditional technology allows imposing restrictions on manipulation of printed materials. For example, copying of a printed material may be prohibited according to the importance of printed content.

An example is shown in FIG. 21, where content classified as strictly confidential is printed with a set of symbols * arranged in letters "Strictly Confidential" being superimposed onto text or another print target.

With this method, as mentioned above, the set of symbols * is arranged to read "Strictly Confidential" as an example. The symbols can visually notify users of whether the information contained in the print target of the printed material has so important content as to be classified as strictly confidential.

Further, the method not only visually notifies users of the importance of the content in the print target in the above manner, but also associates the symbols *, etc. with an instructional content for a predetermined control on a print process. As a printer equipped with an image capturing device, such as a scanner, captures the printed, symbol-containing image with the image capturing device, the printer prohibits or otherwise controls a print process for the print target according to the control content associated with the symbols.

In the following part of the specification, these symbols will be called the symbol pattern.

When the printer controls the print process for the printed material in accordance with a symbol pattern (e.g., "*") provided onto the printed material in this manner, the printer must identify the symbol pattern from the result of image capturing by the image capturing device with high accuracy.

However, results of symbol pattern capturing by the image capturing device can vary depending on the accuracy of image capturing by the image capturing device. The result varies also with irregular printed material results of the symbol pattern due to temporal changes of components of the printer and differences between print processes in individual printers. It is therefore preferable for the image capturing device to be able to capture the symbol pattern with high accuracy even in the presence of irregularities in image capturing accuracy by the image capturing device or irregularities in the printing results of the symbol pattern.

Japanese Unexamined Patent Publication 2002-271625 (Tokukai 2002-271625; published Sep. 20, 2002) discloses an image processing device which adjusts print density to correct irregularities in image capturing between individual devices. However, Tokukai 2002-271625 does not modify data (print-purpose symbol pattern data) to print a symbol pattern in order to identify the symbol pattern with sufficient accuracy.

Conventional technology outputs different results of symbol pattern capturing, depending on print quality of the symbol pattern and accuracy of the image capturing device in the capturing of the symbol pattern. This could result in poor accuracy of the identification of the symbol pattern after capturing the image.

Accordingly, there is a need to capture the symbol pattern with high accuracy even in the presence of irregularities in image capturing accuracy by the image capturing device or irregularities in the printing results of the symbol pattern.

SUMMARY OF THE INVENTION

The present invention, conceived in view of these problems, has an objective to realize a managing device which manages pattern data for use in the output of a pattern which can be accurately identified in the result of image capturing of a pattern by an image capturing device. It is also an objective of the invention to realize an associated print processing system, managing device control method, managing device control computer program, and storage medium containing the managing device control computer program.

A managing device in accordance with the present invention, to achieve the objectives, is characterized in that it manages a result of image capturing by an image capturing device of a pattern, provided onto a printed material, from which information on control of a print process on a print processing device is identified, the managing device including: an obtaining section for obtaining, from a storage device, reference pattern data which provides a reference in identifying the pattern and output pattern data used to print the pattern; a determining section for determining a matching level between the reference pattern data and the result of image capturing, the result of image capturing being produced by the image capturing device of the pattern printed based on the output pattern data; and a modifying section for modifying output pattern data corresponding to a captured pattern if the determining section determines that the matching level is less than a predetermined threshold.

Therefore, the managing device can manage such output pattern data that a pattern can be accurately identified in the result of the image capturing of a pattern by the image capturing device.

Another managing device in accordance with the present invention is characterized in that it manages a result of image capturing by an image capturing device of a pattern, provided onto a printed material, from which information on control of a print process on a print processing device is identified, the managing device including: an obtaining section for obtaining, from a storage device, output pattern data which provides a reference in identifying the pattern and which is used to print the pattern; a determining section for determining a matching level between the output pattern data obtained by the obtaining section and the result of image capturing, the result of image capturing being produced by the image capturing device of the pattern printed based on the output pattern data; and a modifying section for modifying output pattern data corresponding to a captured pattern if the determining section determines that the matching level is less than a predetermined threshold.

Therefore, the managing device in accordance with the present invention can manage such output pattern data that a pattern can be accurately identified in the result of the image capturing of a pattern by the image capturing device without changing the image other than the pattern printed on the printed material.

Another managing device in accordance with the present invention is characterized in that it manages a result of image capturing by an image capturing device of a pattern, provided onto a printed material, from which information on control of a print process on a print processing device is identified, the managing device including: an obtaining section for obtaining reference pattern data which provides a reference in identifying the pattern and multiple sets of output pattern data used to provide a pattern onto a printed material from a storage device containing the data in advance; a determining section for determining a matching level between the reference pattern data and the result of image capturing, the result of image capturing being produced by the image capturing device of the pattern printed based on the output pattern data; and a selecting section for rendering valid only output pattern data, contained in the storage device, which corresponds to a pattern for which the determining section determines that the matching level is greater than or equal to a predetermined threshold.

Therefore, the managing device in accordance with the present invention can manage such output pattern data that a pattern can be accurately identified.

The print processing system in accordance with the present invention is characterized in that it includes a print processing device for providing a pattern onto a printed material based on output pattern data; an image capturing device for capturing the pattern; and the foregoing managing device.

Therefore, the print processing system can accurately control a print process based on the pattern provided onto the printed material, because the managing device can manage such output pattern data that a pattern can be accurately identified in the result of the image capturing of the pattern by the image capturing device.

A method of controlling a managing device in accordance with the present invention is characterized in that it is a method of controlling a managing device for managing a result of image capturing by an image capturing device of a pattern, provided onto a printed material, from which information on control of a print process on a print processing device, is identified, the method including the steps of: (a) obtaining, from a storage device, reference pattern data which provides a reference in identifying the pattern and output pattern data used to provide the pattern onto the printed material; (b) determining a matching level between the reference pattern data and the result of image capturing, the result of image capturing being produced by the image capturing device of the pattern provided onto the printed material based on the output pattern data; and (c) modifying output pattern data corresponding to a captured pattern if it is determined in step (b) that the matching level is less than a predetermined threshold.

Therefore, the method of controlling a managing device in accordance with the present invention can manage for future use such output pattern data that the pattern can be accurately identified in the result of the image capturing of the pattern by the image capturing device.

Another method of controlling a managing device in accordance with the present invention is characterized in that it is a method of controlling a managing device for managing a result of image capturing by an image capturing device of a pattern, provided onto a printed material, from which information on control of a print process on a print processing device is identified, the method including the steps of: (a) obtaining, from a storage device, output pattern data which provides a reference in identifying the pattern and which is used to print the pattern; (b) determining a matching level between the output pattern data and the result of image capturing, the result of image capturing being produced by the image capturing device of the pattern printed based on the output pattern data; and (c) modifying output pattern data corresponding to a captured pattern if it is determined in step (b) that the matching level is less than a predetermined threshold.

Therefore, the method of controlling a managing device in accordance with the present invention can manage for future use such output pattern data that the pattern can be accurately identified in the result of the image capturing of the pattern by the image capturing device.

Another method of controlling a managing device in accordance with the present invention is characterized in that it is a method of controlling a managing device for managing a result of image capturing by an image capturing device of a pattern, provided onto a printed material, from which information on control of a print process on a print processing device is identified, the method including the steps of: (a) obtaining reference pattern data which provides a reference in identifying the pattern and multiple sets of output pattern data used to provide a pattern onto a printed material from a storage device containing the data in advance; (b) determining a matching level between the reference pattern data and the result of image capturing, the result of image capturing being produced by the image capturing device of a pattern provided onto a printed material based on the output pattern data; and (c) rendering valid only output pattern data, contained in the storage device, which corresponds to a pattern for which it is determined in step (b) that the matching level is greater than or equal to a predetermined threshold.

Therefore, the method of controlling a managing device in accordance with the present invention can manage for future use such output pattern data that the pattern can be accurately identified in the result of the image capturing of the pattern by the image capturing device.

For a fuller understanding of the nature and advantages of the invention, reference should be made to the ensuing detailed description taken in conjunction with the accompanying drawings.

BRIEF DESCRIPTION OF THE DRAWINGS

FIG. 6 is a drawing illustrating an example set of data recorded as matching level history information in accordance with the present embodiment.

FIG. 7 is a drawing illustrating an example set of pattern printing data recorded in association with paper trays in accordance with the present embodiment.

FIG. 16 is a drawing illustrating an example set of pattern printing data recorded in association with paper trays in accordance with the present embodiment.

FIG. 18 is a drawing illustrating examples of symbol patterns.

FIG. 21, showing conventional art, is a drawing illustrating an example of a watermark pattern provided onto a printed material.

DESCRIPTION OF THE EMBODIMENTS

Embodiment 1

Short Description of Structure of Print Processing System

Figure 1:
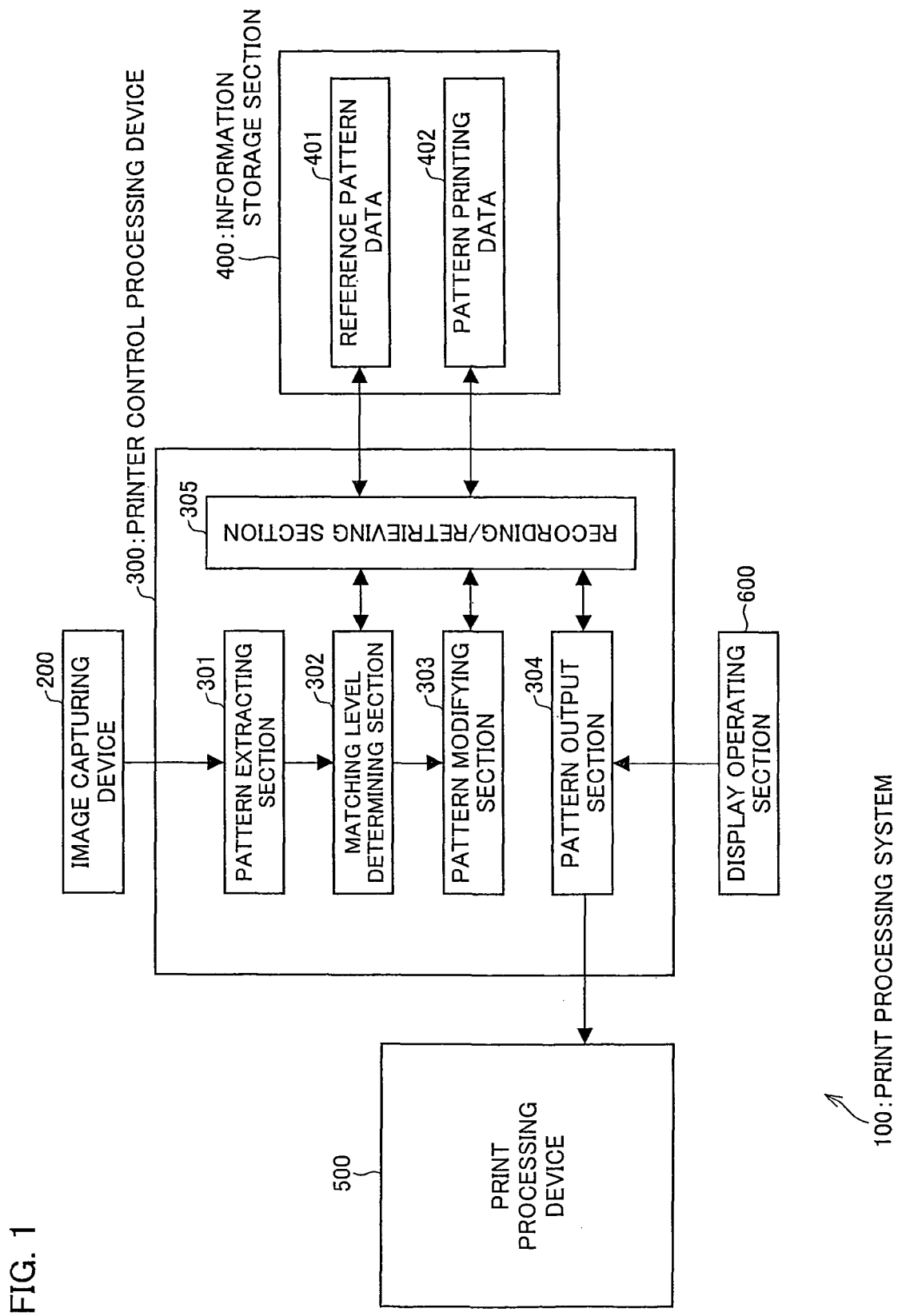
FIG. 1, showing an embodiment of the present invention, is a block diagram illustrating the configuration of a major part of a printer control processing device in relation to a modification process implemented on pattern printing data in a print processing system.
Figure 2:
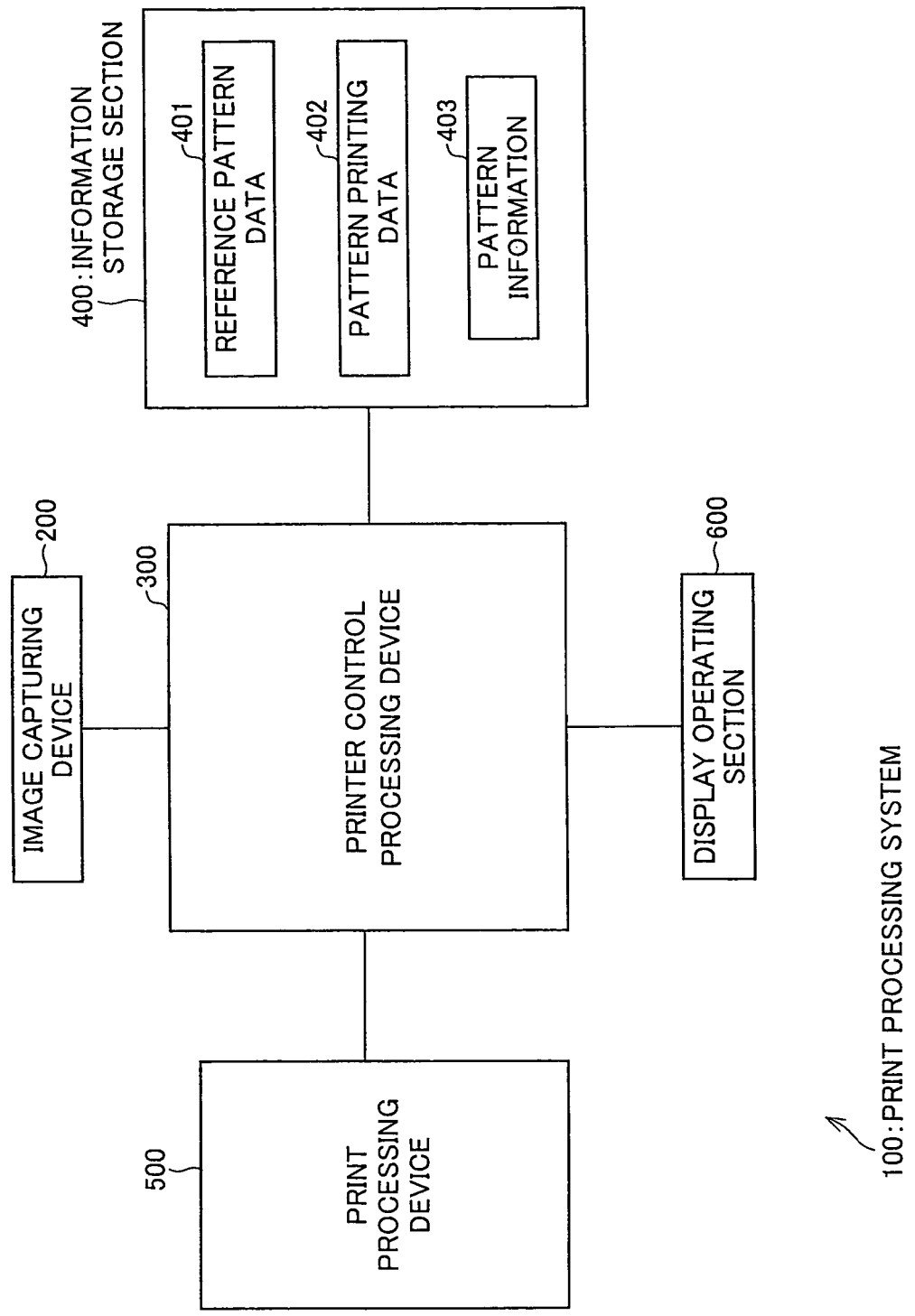
FIG. 2, showing an embodiment of the present invention, is a block diagram illustrating the configuration of a major part of a print processing system.

The following will describe an embodiment of the present invention in reference to FIG. 1 through FIG. 4. A print processing system 100 in accordance with the present embodiment, as shown in FIG. 2, has an image capturing device 200, a printer control processing device 300, an information storage section 400, a print processing device 500, and a display operating section 600.

The image capturing device 200 shines light onto an original document to capture an image, that is, generate color image data representing an image of the original document from reflected light. The image capturing device 200 transmits the generated image data to the printer control processing device 300.

The printer control processing device 300 performs various control for the image capturing device 200, the display operating section 600, and the print processing device 500. Specifically, in response to user commands entered through the display operating section 600, the device 300 instructs the image capturing device 200 to capture an image of the original document and transmit image data obtained by the image capturing by the image capturing device 200 to the print processing device 500 where the image data is processed for printing. Alternatively, in response to an instruction from the display operating section 600, the print processing device 500 instructs the information storage section 400 to transmit pattern printing data 402 stored there to the print processing device 500 to process printing based on the pattern printing data 402 (will be detailed later).

Also, the printer control processing device 300, in response to an instruction from the display operating section 600, can instruct to transmit the image data captured by the image capturing device 200 and the pattern printing data 402 stored in the information storage section 400 to the print processing device 500, provide and print a symbol pattern based on the pattern printing data 402 onto a print target based on the captured image data.

The print processing device 500 prints a color image on paper based on the image data received from the printer control processing device 300. The device 500 is, for example, a copying machine of a tandem type. The print processing device 500 in accordance with the present embodiment prints an image on paper based on the image data received from the printer control processing device 300. The device can also print a symbol pattern associated with information for controlling a print process in the print processing device.

As previously described in reference to FIG. 21, the symbol pattern printed on paper along with a print target may include repetitions of particular symbols forming a watermark pattern or only any one of symbols forming the watermark pattern.

In the present example, it is assumed to clearly present the invention that the symbol patterns printed along with the print target on paper are patterns of one symbol, for example, "*," for convenience in description.

The information storage section 400 is a readable/writeable storage medium and contains reference pattern data 401, the pattern printing data 402, and pattern information 403. In the print processing system 100 in accordance with the present embodiment, the information storage section 400 may be disposed either in the print processing device 500, the image capturing device 200, or the printer control section 300, or disposed separately from these devices. The reference pattern data 401, pattern printing data 402, and pattern information 403 may all be contained in the information storage section 400 or in individual storage media, instead of the information storage section 400.

The reference pattern data 401 contained in the information storage section 400 provides information by which the symbol pattern is identified in the image data obtained as a result of the image capturing of an original document carrying the symbol pattern.

The reference pattern data 401 provides information representing the image data obtained as a result of the image capturing, with an average image capturing device, of the symbol pattern printed based on the pattern printing data 402 prepared in the information storage section 400 in advance. This information representing the image data includes feature values giving the shape (center of gravity) of the symbol pattern, the width of lines forming the symbol pattern, the print density of the symbol pattern, and/or hue of the symbol pattern.

The pattern printing data 402 provides information to provide the symbol pattern onto the paper and is stored in the information storage section 400 in advance. In other words, as the print processing device 500 receives the pattern printing data 402 from the information storage section 400 via the printer control processing device 300, the device 500 can print the symbol pattern on the paper based on the pattern printing data 402.

The pattern printing data 402 includes information giving the shape of the symbol pattern and information giving grayscale levels for the symbol pattern. For example, if the shape of the symbol pattern is represented in bitmap, data including the information giving the represented shape and grayscale levels of the pattern is stored as the pattern printing data 402 in the information storage section 400.

In another example, the shape of the symbol pattern is represented in vector data. In this case, data including the represented shape, grayscale levels, and width of lines of the pattern is stored as the pattern printing data 402 in the information storage section 400.

In the present embodiment, the pattern printing data 402 is modified to fit to a result of capturing the symbol pattern by the image capturing device (detailed later).

The pattern information 403 is information representative of a control content, in relation to a print process, associated with the symbol pattern provided onto the paper. In the present embodiment, the control content in relation to the print process associated with the symbol pattern "*" is a prohibition of the copying of the image captured from an original document.

The display operating section 600 is an input/output device which inputs user commands to the printer control processing device 300 and which also causes a display of information output from the printer control processing device 300. Input means the display operating section 600 is equipped with are, for example, a keyboard, ten keys, cursor keys, and a pointing device, such as a mouse, and a touch panel. Output means the display operating section 600 is equipped with are, for example, various types of display devices including the LCD (liquid crystal display).

The print processing system 100 in accordance with the present embodiment configured as above performs a print process based on an original document (printed material) carrying a symbol pattern as follows.

The image capturing device 200 captures the image on the original document and sends resultant image data to the printer control processing device 300.

The printer control processing device 300 determines whether the received image data contains the symbol pattern. if it does, the device 300 obtains information on the control content for the print process corresponding to the symbol pattern by referring to the pattern information 403 stored in the information storage section 400. Then, the printer control processing device 300 instructs the print processing device 500 to perform control in relation to the print process in accordance with the obtained information.

If the obtained information asks for the prohibition of copying of the image printed on the original document, the printer control processing device 300 instructs the print processing device 500 to stop the print process and processes the image data received from the image capturing device 200 as invalid data without transmitting the data to the print processing device 500.

If the obtained information asks for the prohibition of secondary copying, the device 300 performs the following process. The prohibit of secondary copying is the prohibition of making a copy of a copy of an original document. In other words, it prohibits copying of a copied material of an original material.

The printer control processing device 300 transmits the image data received from the image capturing device 200 except the symbol pattern to the print processing device 500. The device 300 also selects the symbol pattern associated with the copy prohibiting content from the pattern printing data and transmits the image data for the symbol pattern. The device 300 then instructs the print processing device 500 to print both the image data except the symbol pattern and the image data for an altered, new symbol pattern onto paper to the print processing device 500.

In response to the instruction from the printer control processing device 300, the print processing device 500 performs a print process based on the image data received from the printer control processing device 300.

In contrast, to output the symbol pattern on a printed material which has been subjected to a print process based on the image data captured by the image capturing device 200, the print processing system 100 performs a following process.

For example, to prohibit copying of a printed material, first, the user enters through the display operating section 600 commands which execute a print process and prohibit copying of a printed material obtained as a result of the print process. These commands are transmitted from the display operating section 600 to the printer control processing device 300.

As the printer control processing device 300 receives the user commands from the display operating section 600, the device 300 instructs the image capturing device 200 to obtain image data. The device 300 transmits the obtained image data to the print processing device 500 and transmits the pattern printing data 402 for the symbol pattern associated with the copy prohibiting content to the print processing device 500.

In addition, the printer control processing device 300 instructs the print processing device 500 to execute a print process based on the image data and to print the symbol pattern as well as the image based on the image data. The print processing device 500 performs a print process based on the instruction, as well as the image data and the pattern printing data 402, received from the printer control processing device 300.

In this manner, the print processing system 100 in accordance with the present embodiment can control the print process on the print processing device 500 in accordance with the symbol pattern provided to the original document. As to a printed material for which the control of the print process is desirable, the system 100 can also provide and print a symbol pattern associated with the content of the control.

Incidentally, the result of image capturing by the image capturing device 200 can vary with the image capturing capability of the image capturing device 200. Therefore, the printer control processing device 300 cannot always identify the pattern from the image data obtained as a result of the image capturing device 200 capturing the symbol pattern print based on the pattern printing data 402 prepared in advance.

Accordingly, the print processing system 100 in accordance with the present embodiment is configured to modify the pattern printing data 402 so that the symbol pattern on the printed material can be accurately identified in the result of the image capturing by the image capturing device 200. Now, the following will describe a modification process for the pattern printing data 402 in the print processing system 100 in accordance with the present embodiment in reference to FIG. 1.

FIG. 1 is a block diagram illustrating the configuration of a major part of the printer control processing device 300 in relation to a modification process for the pattern printing data 402 in the print processing system 100 in accordance with the present embodiment.

Configuration of the Printer Control Processing Device in Relation to Modification Process for Pattern Printing Data As shown in FIG. 1, the printer control processing device 300 in accordance with the present embodiment includes, as functional blocks in relation to a modification process for pattern printing data, a pattern extracting section 301, a matching level determining section 302, a pattern modifying section 303, a pattern output section 304, and a recording/retrieving section 305. These sections are functional blocks realized by a CPU (not shown) executing a computer program stored in a storage device such as a ROM (read only memory) to control periphery circuits such as an input/output circuit (not shown). The pattern output section 304 and the recording/retrieving section 305 form an output section.

The pattern extracting section 301 extracts image data for the symbol pattern received from the image capturing device 200. Also, from the extracted image data, the section 301 calculates feature values, such as the shape (position of the center of gravity), density, hue, and/or width of lines, of the symbol pattern. The pattern extracting section 301 then transmits the feature values of the extracted symbol pattern to the matching level determining section 302.

The matching level determining section 302 instructs the recording/retrieving section 305 to obtain the reference pattern data 401. The section 302 calculates a matching level between the reference pattern data 401 and the feature values received from the pattern extracting section 301. The section 302 then determines whether the matching level is not less than a predetermined threshold.

If the matching level turns out to be less than the predetermined threshold in the determination, the matching level determining section 302 instructs the pattern modifying section 303 to modify the pattern printing data 402.

The predetermined threshold is determined in view of a tolerance range to determine whether the image data for the symbol pattern extracted by the pattern extracting section 301 is image data representing the symbol pattern. In other words, if the matching level between the feature values representing the image data for the extracted symbol pattern and the reference pattern data 401 is less than the threshold, the symbol pattern cannot be identified as corresponding to the reference pattern data 401.

In addition, the predetermined threshold can be specified by obtaining the following value in advance. In other words, the pattern that has the highest matching level with the symbol pattern is selected in advance from patterns which are symbol patterns other than the symbol pattern in accordance with the present embodiment and which are possibly used in printing. A matching level between the pattern and the symbol pattern in accordance with the present embodiment is obtained.

Then, the predetermined threshold is specified in a range sufficiently higher than the obtained matching level, that is, a range in which the pattern that most resembles the symbol pattern in accordance with the present embodiment can be sufficiently distinguished.

In accordance with an instruction from the matching level determining section 302, the pattern modifying section 303 modifies the pattern printing data 402. In other words, the pattern modifying section 303 instructs the recording/retrieving section 305 to retrieve the pattern printing data 402 from the information storage section 400.

The pattern modifying section 303 modifies based on the pattern printing data 402 so that the symbol pattern can be printed at a higher density, with thicker lines, in different hues, etc.

The pattern output section 304 transmits the pattern printing data 402 to the print processing device 500 in accordance with a print command for the symbol pattern from the display operating section 600. The pattern output section 304 instructs the recording/retrieving section 305 to retrieve the pattern printing data 402 from the information storage section 400 and transmit to the print processing device 500.

The recording/retrieving section 305 is an interface controlling information input/output between the printer control processing device 300 and the information storage section 400.

Figure 3:
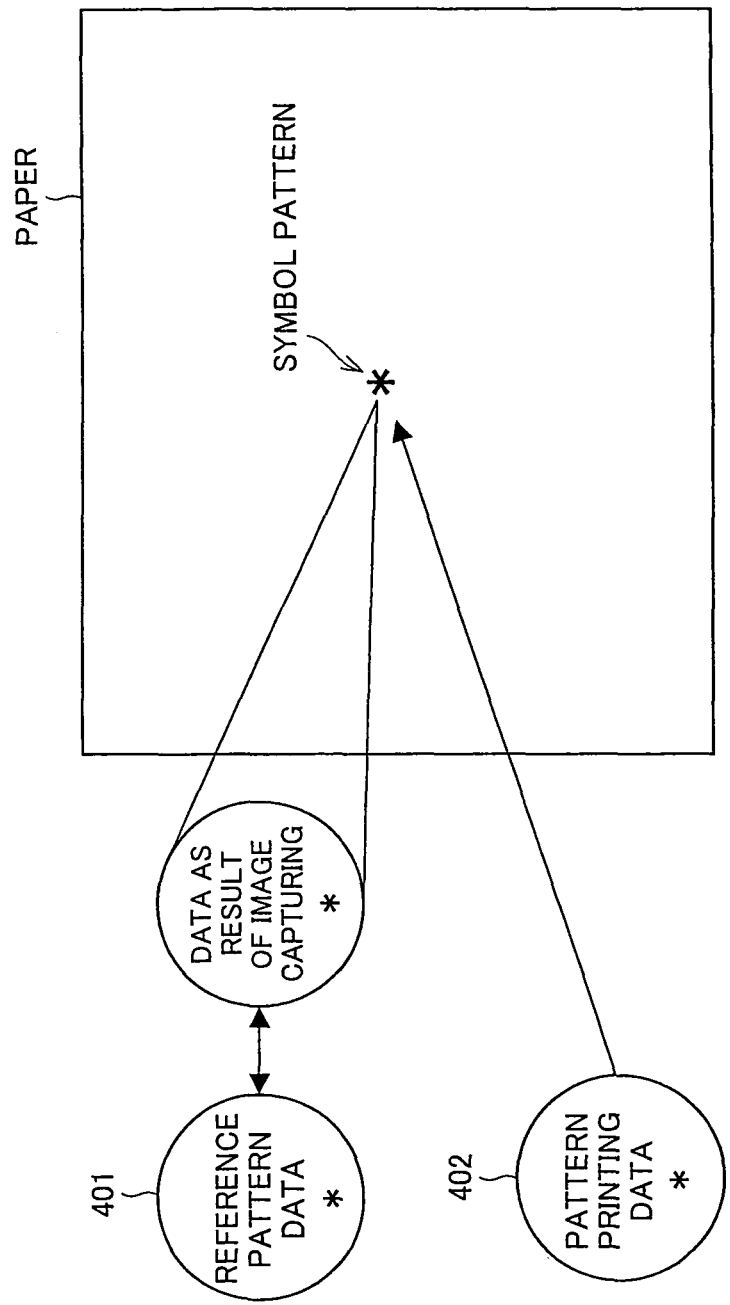
FIG. 3, showing an embodiment of the present invention, is a drawing illustrating a comparison process of an image capturing result of a symbol pattern with reference pattern data.

In this manner, the print processing system 100 configured as above can print the symbol pattern on paper based on the pattern printing data 402 as shown in FIG. 3.

In addition, the system 100 is configured to compare the feature values of the symbol pattern which is a result of the image capturing of the symbol pattern by the image capturing device 200 to the reference pattern data 401 stored in advance in the information storage section 400 and calculate the matching level between the feature values and the reference pattern data 401. If the matching level is less than the predetermined threshold, the system 100 modifies the pattern printing data 402.

Figure 4:
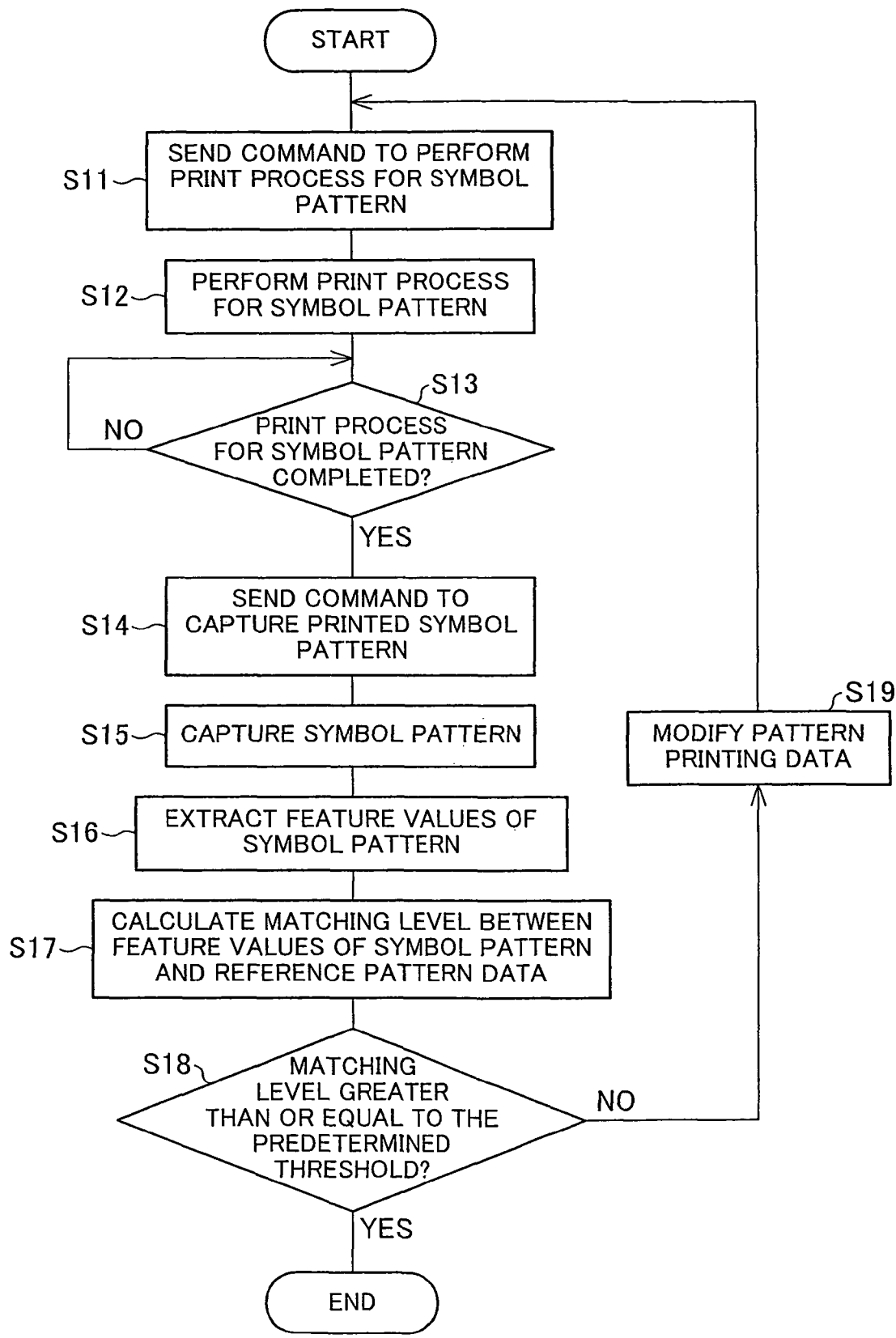
FIG. 4, showing an embodiment of the present invention, is a flow chart illustrating a modification process for pattern printing data.

Accordingly, the following will describe a modification process for the pattern printing data in the print processing system 100 in accordance with the present embodiment in reference to FIG. 4. FIG. 4 is a flow chart illustrating a modification process for the pattern printing data 402 in the print processing system 100 in accordance with the present embodiment.

Modification Process 1 for Pattern Printing Data

The print processing system 100 in accordance with the present embodiment performs a modification process on the pattern printing data 402 as a test process prior to an ordinary print process. Then, as mentioned above as conditions, the information storage section 400 contains in advance the reference pattern data 401 and the pattern printing data 402. these sets of data are stored in the section 400 when the printer control processing device 300 is shipped from a factor.

First, the user operates the display operating section 600 to send a command to perform a print process for a symbol pattern based on the pattern printing data 402 (step S11; hereinafter, "S11").

In accordance with the command entered through the display operating section 600, the pattern output section 304 instructs the recording/retrieving section 305 to retrieve the pattern printing data 402 for output to the print processing device 500. The print processing device 500 then performs a print process for the symbol pattern based on the pattern printing data 402 supplied from the printer control processing device 300 (S12).

If the symbol pattern is printed successfully on paper in this manner (YES in S13), the user takes the paper, discharged from the print processing device 500, which now carries the symbol pattern printed on it, and places the paper onto an original document platen (not shown) on the image capturing device 200.

The user then operates the display operating section 600 to send a command to capture the symbol pattern (S14). Upon receipt of the image capturing command from the display operating section 600, the printer control processing device 300 instructs the image capturing device 200 to capture the symbol pattern printed on the paper. The image capturing device 200 captures the symbol pattern on the paper and generates image data in accordance with the instruction from the printer control processing device 300. In this manner, the image capturing device 200 captures the symbol pattern from the paper on which the symbol pattern is printed (S15).

As the image capturing device 200 transmits the generated image data to the printer control processing device 300, the pattern extracting section 301 extracts the feature values of the symbol pattern based on the received image data for the symbol pattern (S16). The pattern extracting section 301 then transmits the extracted feature values to the matching level determining section 302.

The matching level determining section 302 compares the feature values of the symbol pattern received from the pattern extracting section 301 to the reference pattern data 401 to calculate a matching level between the feature values of the symbol pattern and the reference pattern data 401 (S17). The matching level determining section 302 then determines whether the calculated matching level is not less than the predetermined threshold (S18). If the level is not less than the predetermined threshold (YES in S18), the printer control processing device 300 terminates the process.

In contrast, if the calculated matching level is less than the predetermined threshold (NO in S18), the matching level determining section 302 instructs the pattern modifying section 303 to modify the pattern printing data 402. In accordance with the instruction from the matching level determining section 302, the pattern modifying section 303 modifies the pattern printing data (S19).

If the feature values of the symbol pattern captured by the image capturing device 200 indicate that the density of the symbol pattern does not reach the predetermined threshold for example, the section 303 modifies so that the print density level indicated in the pattern printing data 402 is increased.

In contrast, if the feature values indicate that the width of lines constituting the symbol pattern does not reach the predetermined threshold, the pattern modifying section 303 modifies so that the width-of-line level indicated in the pattern printing data 402 is increased.

In other words, as mentioned above, the pattern printing data 402 contains the information representative of the shape of the symbol pattern and the information specifying the grayscales level for the symbol pattern. Accordingly, the value given by that information specifying the grayscale levels is changed to yield grayscale levels with higher print density. Alternatively, the information specifying the width of lines of the symbol pattern in the information representative of the shape of the symbol pattern is changed.

Then, the user again operates the display operating section 600 to send a command to execute a print process based on the modified pattern printing data. As mentioned earlier, the symbol pattern printed based on the pattern printing data 402 modified is again retrieved by the image capturing device 200 to check the matching level between the feature values of the image data for the symbol pattern and the reference pattern data 401.

In other words, the process starting with step S11 shown in the process flow is repeated until the matching level between the feature values of the image data for the symbol pattern and the reference pattern data reaches a predetermined threshold or greater.

In this manner, the pattern modifying section 303 modifies the pattern printing data 402 to improve the matching level calculated by the matching level determining section 302.

The system 100 is configured so that in the above modification of the pattern printing data 402, the density level and the width of lines, for example, are modified so that they increase by small quantities from those levels which determine the current density level and width of lines to use as little toner as possible in the print process executed by the print processing device 500.

In other words, the levels which determine the current density level, width of lines, etc. of the pre-modified pattern printing data 402 are not increased by a large quantity at a time, but in stages. This modification of the pattern printing data 402 allows the print processing system 100 in accordance with the present embodiment to lower toner consumption in additionally printing the pattern on the printed material.

The print processing system 100 in accordance with the present embodiment, as mentioned above, can modify the pattern printing data 402 if the matching level between the reference pattern data and the result of the image capturing device capturing the symbol pattern provided onto the printed material is determined to be less than or equal to the predetermined threshold based on the pattern printing data 402.

Therefore, the printer control processing device 300 in the print processing system 100 can modify the pattern printing data 402 until the symbol pattern can be accurately identified in the image capturing result of the symbol pattern by the image capturing device 200. In other words, the device 300 can correct irregularities in the image capturing result caused by the image capturing capability of the image capturing device 200 to generate such output pattern data that the symbol pattern can be reliably identified.

In addition, the printer control processing device 300 is configured to modify the pattern printing data 402 per se, not the development bias, charge potential, or other property of the print processing device which may affect the whole image on the printed material. Thus, the other image printed on the printed material does not change. In other words, the density, width of lines, hue, etc. of the symbol pattern provided onto the printed material can be changed without changing the image printed on the printed material.

Therefore, the printer control processing device 300 can manage for later use the pattern printing data 402 according to which the symbol pattern can be accurately identified, without changing the image printed on the printed material except the symbol pattern, in the image capturing result of the symbol pattern by the image capturing device.

The printer control processing device 300 has assumed such a configuration that the reference pattern data 401 and the pattern printing data 402 are separately contained in the information storage section 400. The two sets of data may be used commonly.

When printing the symbol pattern on paper as in the foregoing, the print processing system 100 in accordance with the present embodiment is configured to print the symbol pattern in visually hard-to-recognize yellow hue on the paper. This is because the symbol pattern is provided onto the printed material for use, and it is preferable to print the symbol pattern in such a hue that the pattern does not stand out from the print target.

However, although the symbol pattern (yellow hue) has been modified in the printer control processing device 300 so that the pattern is more accurately identified, if the symbol pattern is printed on paper of a similar color (yellow), the matching level between the feature values of the symbol pattern and those of the reference pattern data may fall.

In addition, it is not only the hue of the paper on which the symbol pattern is printed that affects the image capturing result of the symbol pattern by the image capturing device 200. The result may also differ depending on other properties of the paper, including the substance from which the paper is made.

Further, the matching level between the feature values extracted from the symbol pattern and the reference pattern data 401 may fall due to, for example, degradation of a cleaning blade (not shown) provided to the print processing device 500, changes in surface potential of the photoreceptor (not shown), and other changes over time over the course of use of the print processing device 500, and also due to degradation of the symbol pattern printed on the paper.

Therefore, the print processing system 100 is preferably configured so that it can provide pattern printing data in accordance with the prosperities of the paper in the paper trays 503a to 503c. Further, the system 100 is preferably configured so that it can also modify the pattern printing data in accordance with degradation of the print processing device 500 or the printed symbol pattern.

Now, as the print processing system 100 configured as above, another embodiment of the print processing system 100 in accordance with the present embodiment will be described as embodiment 2 below.

Embodiment 2

Configuration of Printer Control Processing Device in Relation to Modification Process for Pattern Printing Data Referring to FIG. 5 to FIG. 8, the following will describe embodiment 2 which is another embodiment of the present invention.

Figure 5:
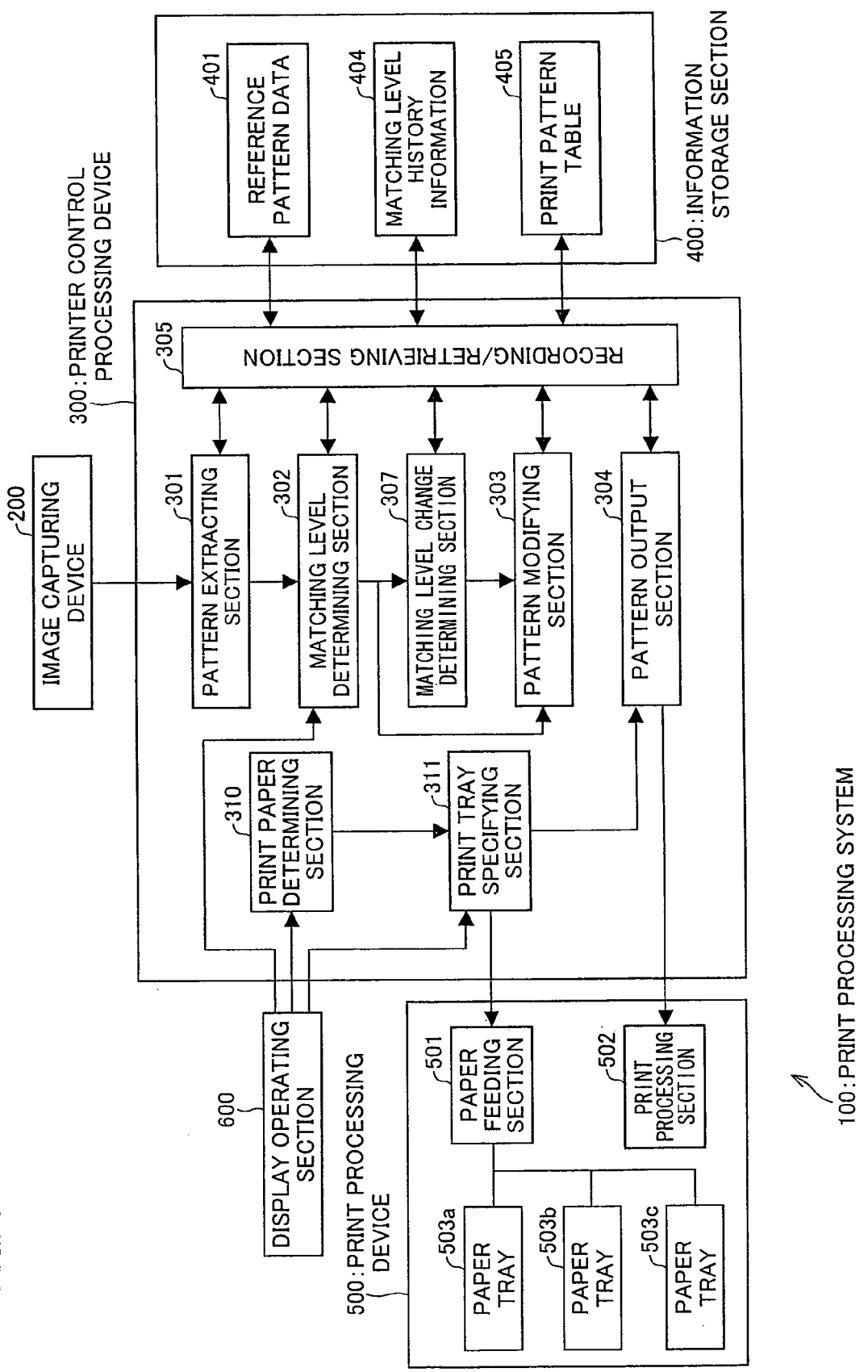
FIG. 5, showing an embodiment of the present invention, is a block diagram illustrating the configuration of a major part of a printer control processing device in relation to a modification process for pattern printing data.

The print processing system 100 in accordance with the present embodiment has a similar configuration to that of the print processing system 100 of embodiment 1 shown in FIG. 2. Description of individual devices and members in the system 100 in accordance with the present embodiment is omitted. Note however that comparing embodiment 1 to the present embodiment (embodiment 2), the functional blocks in the printer control processing device 300 in relation to the modification process for the pattern printing data 402 are different as shown in FIG. 5. FIG. 5 is a block diagram illustrating the configuration of a printer control processing device in relation to a modification process for pattern printing data in accordance with another embodiment of the present invention.

As shown in FIG. 5, the printer control processing device 300 in accordance with the present embodiment differs from the configuration in embodiment 1 in that the device 300 includes a matching level change determining section 307, a print paper determining section 310, and a print tray specifying section 311 as additional functional blocks.

Now, these additional functional blocks of the present embodiment will be described.

The matching level change determining section 307 evaluates a change in the matching level between the reference pattern data 401 and the feature values of the symbol pattern captured by the image capturing device 200.

In the printer control processing device 300 in accordance with the present embodiment, the matching level determining section 302 compares the feature values of the captured symbol pattern to the reference pattern data 401 (detailed later). As a result of the comparison, the matching level determining section 302 sends a matching level greater than or equal to a predetermined threshold to the matching level change determining section 307.

The matching level change determining section 307 is configured to then compare the received matching level to a previously calculated matching level, and if it exceeds a predetermined threshold, stores as matching level history information 404 in the information storage section 400.

If the matching level is evaluated to have decreased, the matching level change determining section 307 instructs the pattern modifying section 303 to modify the pattern printing data 402 contained in a print pattern table 405.

If the print paper determining section 310 receives a print process execution command for the symbol pattern together with information specifying the type of printing paper from the user, the section 310 identifies the paper tray containing the paper specified by the user in accordance with the command.

In other words, in the print processing device 500 in accordance with the present embodiment, each paper tray 503a to 503c is designated in advance to contain particular type of paper in accordance with the type of paper.

Accordingly, as the print paper determining section 310 receives information specifying the type of paper from the user via the display operating section 600, the section 310 identifies the paper trays 503a to 503c based on the instruction. The section 310 then transmits the result of the identification to the print tray specifying section 311. The type of paper may include, for example, size, hue, and material of the paper.

If the print tray specifying section 311 receives a print process execution command for a symbol pattern together with information on the paper trays 503a to 503c specified by the user in accordance with this instruction, the section 311 instructs the print processing device 500 to feed paper from the paper tray specified by the user.

In contrast, the print tray specifying section 311 instructs the pattern output section 304 to output a symbol pattern in accordance with the paper contained in the paper tray specified by the user.

A symbol pattern is provided for each type of paper. The symbol pattern is recorded in the print pattern table 405 as being accurately identifiable in the print processing system 100 in accordance with the present embodiment.

In other words, in the print processing system 100 in accordance with the present embodiment, the print pattern table 405 contains data for symbol patterns which can be accurately identified in accordance with individual types of paper. Accordingly, the pattern output section 304 can select a symbol pattern which matches with the type of paper in the paper trays 503a to 503b specified by the user in reference to the print pattern table 405.

The print tray specifying section 311 instructs the print processing device 500 to feed paper from the paper trays 503a to 503c in accordance with the determination by the print paper determining section 310 and also instructs the pattern output section 304 to output a symbol pattern.

The present embodiment differs from embodiment 1 in the following points.

A difference is found where the matching level determining section 302 compares the matching level between the feature values of a captured symbol pattern and the reference pattern data 401 and as a result of the comparison, transmits information on a matching level greater than or equal to a predetermined threshold to the matching level change determining section 307, and instructs to compare the matching level to a previously calculated matching level.

Based on an output instruction for the pattern printing data 402 from the print tray specifying section 311, the pattern output section 304 selects the pattern printing data 402 corresponding to the specified paper trays 503a to 503c in reference to the print pattern table 405. The section 304 then outputs the selected pattern printing data 402 to the print processing device 500, which is a difference from the pattern output section 304 in embodiment 1.

A difference from the print processing system 100 in embodiment 1 is also found where when comparing the matching level between the reference pattern data 401 and the result of the image capturing of the printed symbol pattern by the image capturing device 200, the information specifying a paper tray which contains the printed paper carrying the symbol pattern is entered by the user operating the display operating section 600. The information on the paper tray entered through the display operating section 600 is received by the matching level determining section 302.

In other words, if the matching level determining section 302 determines that the matching level between the feature values of the captured symbol pattern and the reference pattern data 401 is less than the predetermined threshold, the section 302 instructs the pattern modifying section 303 to modify both the information on the paper tray and the pattern printing data 402 corresponding to the paper tray.

In contrast, if the matching level determining section 302 determines that the matching level between the feature values of the captured symbol pattern and the reference pattern data 401 is greater than or equal to the predetermined threshold, the section 302 transmits the information on the paper tray to the matching level change determining section 307. Then, the matching level determining section 302 instructs the matching level change determining section 307 to determine whether the matching level for the pattern printing data 402 corresponding to the paper in that paper tray has decreased over time in reference to a past history.

Next, the information contained in the information storage section 400, particularly how it differs between the present embodiment and embodiment 1, will be described.

The information storage section 400 differs in that it contains the matching level history information 404 and the print pattern table 405, not the pattern printing data 402.

The matching level history information 404, as shown in FIG. 6, is history records of the matching levels obtained from comparison of the feature values extracted from the captured symbol pattern to the reference pattern data 401.

In other words, the print processing system 100 in accordance with the present embodiment is adapted to perform a test process in which the matching level between the captured symbol pattern and the reference pattern data 401 is examined for a regular checkup of a change in the result of the image capturing of the symbol pattern. The system 100 is also adapted to record the matching level obtained in the test process.

The print pattern table 405 contains the pattern printing data 402 for each of the paper trays 503a to 503c as shown in FIG. 7. In the print processing system 100 in accordance with the present embodiment, a type of paper is determined for each paper tray 503a to 503c in advance when the system 100 is shipped from a factory.

Also, the pattern printing data 402 in accordance with the individual paper trays 503a to 503c for which the paper types are determined is recorded as the print pattern table 405 in the information storage section 400 upon the shipment from the factory.

However, the print processing system 100 may be configured to let the user decide as they like a type of paper for each paper tray 503a to 503c after the shipment, without determining types of paper for the paper trays 503a to 503c in advance.

To have the print processing system 100 allow the user to decide a type of paper for each paper tray 503a to 503c as they like, the print pattern table 405 is generated and recorded in the information storage section 400 as follows.

The information storage section 400 contains the pattern printing data 402 in advance. Similarly to embodiment 1, the pattern printing data 402 is modified for each type of paper in the paper trays 503a to 503c so that the printer control processing device 300 can accurately recognize the data 402.

In this manner, the pattern printing data 402 accurately identifiable in accordance with the type of paper in the paper trays 503a to 503c is generated. Then, the generated pattern printing data 402 is recorded in the information storage section 400 as the print pattern table 405 in association with the information specifying the paper trays 503a to 503c.

Although not shown in FIG. 1, the print processing device 500 includes a print processing section 502, a paper feeding section 501, and the paper trays 503a to 503c.

The print processing section 502 processes printing based on image data. The paper feeding section 501 selects the paper trays 503a to 503c containing paper to be fed, selects one of the paper trays 503a to 503c, and controls the feeding of printing paper. Although FIG. 5 shows only the three paper trays 503a to 503c, this is by no means limiting the number of paper trays. There may be two paper trays or may be more than three of them.

As described in the foregoing, in the print processing system 100 in accordance with the present embodiment, the print pattern table 405 is contained in the information storage section 400. Therefore, the pattern printing data 402 is manageable or modifiable in accordance with the type of paper contained in the individual paper trays 503a to 503c.

As mentioned earlier, in the print processing system 100 in accordance with the present embodiment, the information storage section 400 contains the matching level history information 404, and the printer control processing device 300 includes the matching level change determining section 307.

Therefore, the system 100 is capable of examining changes in the result of the image capturing of the symbol pattern by the image capturing device which can be caused by changes over time of the print processing device 500 or the printed symbol pattern and other factors.

Figure 8:
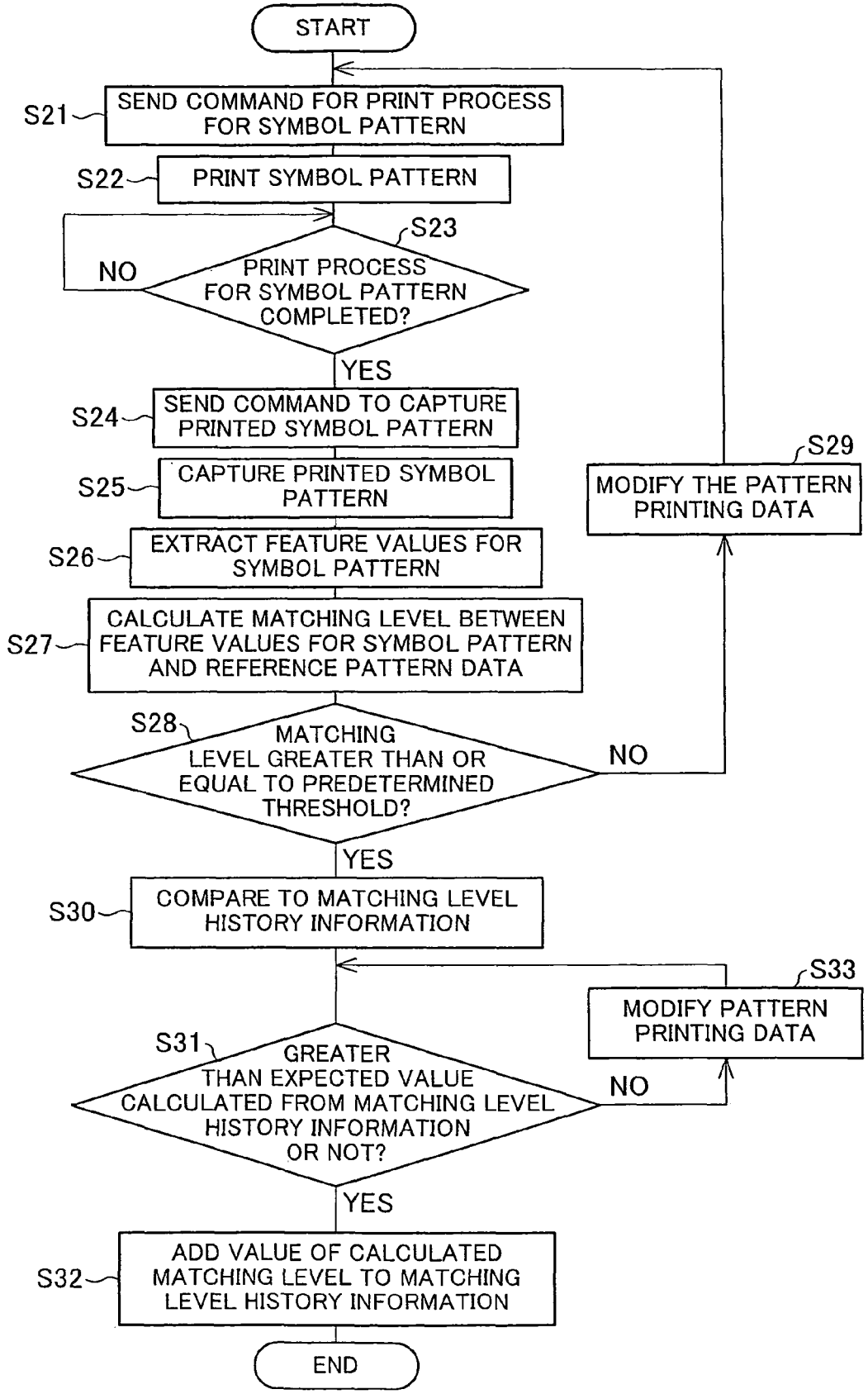
FIG. 8, showing an embodiment of the present invention, is a flow chart illustrating a modification process for pattern printing data implemented in accordance with changes in the result of symbol pattern capturing.

Now, referring to FIG. 8, the following will describe in detail a modification process for the pattern printing data 402. The process is implemented in accordance with the changes in the result of the image capturing of the symbol pattern which can be caused by changes over time of the print processing device 500 or the printed symbol pattern and other factors. FIG. 8 is a flow chart illustrating a modification process for the pattern printing data implemented in accordance with changes in the result of the image capturing of the symbol pattern.

Modification Process for Pattern Printing Data Implemented in Accordance with Changes in Result of Image Capturing of Symbol Pattern It is presumed here that the information storage section 400 contains the print pattern table 405 which contains the pattern printing data 402 in association with the individual paper trays 503a to 503c.

It is also presumed that the information storage section 400 contains, as the matching level history information 404, a history of the matching level between the feature values of the already captured symbol pattern and the reference pattern data 401.

It is further presumed that a period has elapsed after an examination of the matching level between the feature values extracted from the captured symbol pattern and the reference pattern data 401.

under these circumstances, the user specifies one of the paper trays 503a to 503c and sends a command to start a print process for the pattern printing data through operation of the display operating section 600 (S21).

It is presumed that in the operation, the user has specified the paper tray 503a as the paper tray in which the paper on which the symbol pattern will be printed is stored.

In accordance with the user command, the print tray specifying section 311 in the printer control processing device 300 instructs the print processing device 500 to feed paper from the paper tray 503a and instructs the pattern output section 304 to output the pattern printing data 402 corresponding to the paper tray 503a to the print processing device 500.

In accordance with the instruction, the print processing device 500 feeds paper from the paper tray 503a. Meanwhile, the pattern output section 304 retrieves the pattern printing data 402 associated with the paper tray 503a from print pattern table 405 via the recording/retrieving section 305. The section 304 then transmits the retrieved pattern printing data 402 to the print processing device 500.

Upon receipt of the pattern printing data 402, the print processing device 500 prints the symbol pattern on the paper fed from the paper tray 503a (S22). As the print process for the symbol pattern completes (YES in S23), the user places the paper on which the symbol pattern is now printed onto the original document platen of the image capturing device 200.

Then, the user operates the display operating section 600 to send an image capturing process command to the printer control processing device 300 which in turn instructs the image capturing device 200 to capture image data for the symbol pattern from the paper placed on the platen (S24).

Upon receipt of the instruction, the printer control processing device 300 instructs the image capturing device 200 to capture the symbol pattern from the paper placed on the original document platen. Upon receipt of the instruction, the image capturing device 200 captures image data for the symbol pattern (S25). Then, the image capturing device 200 transmits the captured image data for the symbol pattern to the printer control processing device 300.

When the user sends an image capturing command for the symbol pattern to the image capturing device 200, the user enters also information specifying the paper tray 503a in which the paper on which the symbol pattern will be printed is stored. The information specifying the paper tray 503a is transmitted to the matching level determining section 302 via the display operating section 600.

In the printer control processing device 300, as the pattern extracting section 301 receives image data for a symbol pattern from the image capturing device 200, the section 301 extracts feature values for the symbol pattern based on the image data (S26). Then, the pattern extracting section 301 transmits the extracted feature values to the matching level determining section 302.

As the matching level determining section 302 receives the feature values from the pattern extracting section 301, the section 302 calculates a matching level between the feature values and the reference pattern data 401 (S27) and determines whether the calculated matching level reaches the predetermined threshold (S28). If the matching level is determined not to reach the predetermined threshold (NO in S28), the matching level determining section 302 instructs the pattern modifying section 303 to modify the pattern printing data 402 recorded in association with the paper tray 503a. The pattern modifying section 303 then modifies the pattern printing data 402 corresponding to the paper tray 503a contained in the print pattern table 405 in accordance with the instruction from the matching level determining section 302 (S29).

In the modification of the pattern printing data 402 contained in the print pattern table 405, for example, if the feature value representing the density of the symbol pattern captured by the image capturing device 200 does not reach the predetermined threshold, the data 402 is modified so that the print density level setting as the pattern printing data 402 is increased as described in embodiment 1.

If the feature value representing the width of lines constituting the symbol pattern does not reach the predetermined threshold, the pattern modifying section 303 modifies the value determining the width-of-lines settings as the pattern printing data 402 so that the width of lines is increased.

In contrast, if the matching level determining section 302 determines that the calculated matching level is greater than or equal to the predetermined threshold (YES in S28), the section 302 transmits the information on the calculated matching level to the matching level change determining section 307 and instructs the section 307 to compare the calculated matching level to a previously calculated matching level.

The matching level change determining section 307 instructs the recording/retrieving section 305 to retrieve the matching level history information 404 from the information storage section 400 in accordance with the instruction from the matching level determining section 302 to obtain the matching level history information 404.

Then, the matching level change determining section 307 compares the currently calculated matching level to the previously calculated matching level in reference to the obtained matching level history information 404 (S30) and determines whether the currently calculated matching level is greater than an expected value calculated from the matching level history information 404 (S31).

The expected value is the value the currently calculated matching level is expected to take as predicted from previous matching levels. In the present embodiment, the expected value is specified to a value greater than the lowest one of the matching levels in the matching level history information 404. Therefore, the matching level change determining section 307 compares the currently calculated matching level to the lowest one of the matching levels in the matching level history information 404.

If the calculated matching level is determined to be greater than the expected value, that is, the lowest matching level in the matching level history information 404 (YES in S31), the matching level change determining section 307 adds the value of the currently calculated matching level to the matching level history information 404 for storage (S32).

In contrast, if the calculated matching level is determined to be less than the expected value, that is, the lowest matching level in the matching level history information 404 (NO in S31), the matching level change determining section 307 instructs the pattern modifying section 303 to modify the pattern printing data 402 corresponding to this calculated matching level value (associated with the paper tray 503a), (S33).

In this manner, the pattern modifying section 303 modifies the pattern printing data 402 contained in the print pattern table 405 in accordance with the instruction from the matching level change determining section 307. The pattern modifying section 303 repeats the modification of the pattern printing data 402 until the matching level becomes greater than or equal to the expected value.

The pattern printing data 402 is modified by the pattern modifying section 303 similarly to step S29. However there is the following difference.

The pattern printing data 402 that is modified in step S33 contains the calculated feature value which has been determined to be greater than or equal to the predetermined threshold in the comparison with the reference pattern data 401. Therefore, the modification in S33 is smaller than the modification in S29, which is the difference.

As described in the foregoing, if the matching level between the reference pattern data 401 and the feature values obtained from the image data for the symbol pattern captured by the image capturing device 200 does not reach the predetermined threshold, the print processing system 100 in accordance with the present embodiment can modify the pattern printing data 402 corresponding to the captured symbol pattern.

In addition, even if the matching level between the reference pattern data 401 and the feature values obtained from the image data for the captured symbol pattern is greater than or equal to the predetermined threshold, the system 100 can modify the pattern printing data 402 corresponding to the symbol pattern if this matching level is less than the expected value obtained from the previous matching levels for the symbol pattern. Therefore, the system 100 can modify the pattern printing data 402 in accordance with changes in the result of the image capturing of the symbol pattern which are caused by changes over time of the print processing device 500 or the printed symbol pattern and other factors.

The pattern printing data 402 is recorded in accordance with the properties of the paper contained in the paper trays 503a to 503c. Therefore, even if the result of the image capturing of the symbol pattern by the image capturing device 200 in accordance with the properties of the paper differs, the pattern printing data 402 by which the symbol pattern is reliably identified is recorded in the information storage section 400.

In the present embodiment, the expected value is specified to be the lowest one of the matching levels in the matching level history information 404. This is by no means limiting the invention. For example, the expected value may be the average value of the matching levels stored as the matching level history information 404. If there is a tendency that the matching level increases in proportional to the date and time contained in the matching level history information 404, the expected value may be determined from the lastly recorded matching level value with the change ratio being taken into consideration.

In embodiment 1, the system 100 is configured to modify the pattern printing data 402 contained in the information storage section 400 and record the pattern printing data 402 which is be reliably identified by the printer control processing device 300. This is by no means intended to restrict the configuration in which the pattern printing data 402 which is reliably identified by the printer control processing device 300 is recorded.

The following will describe, as embodiment 3, another embodiment of the present invention in reference to FIG. 9 to FIG. 14.

Embodiment 3

Figure 9:
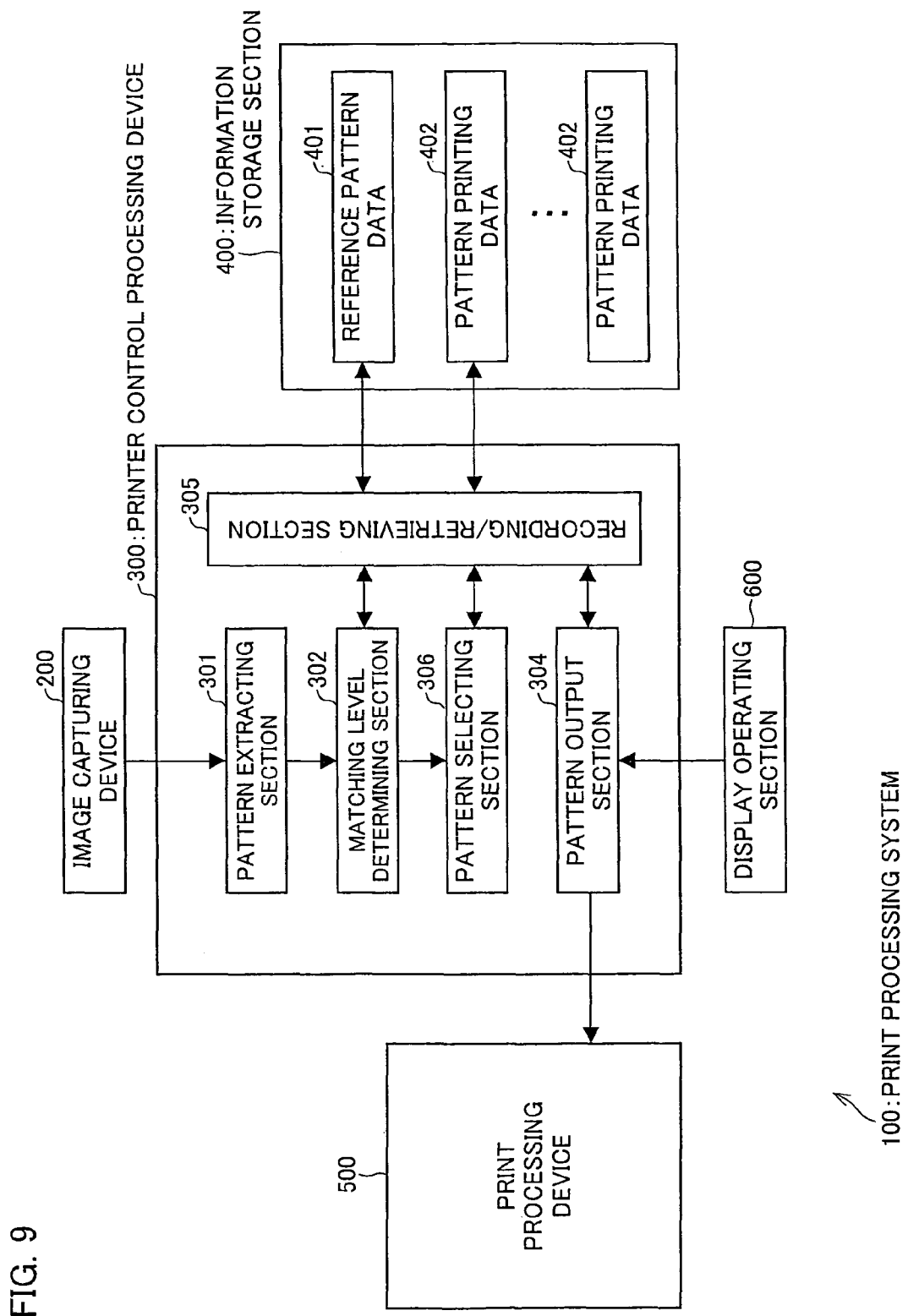
FIG. 9, showing an embodiment of the present invention, is a block diagram illustrating the configuration of a major part of a printer control processing device in relation to a selection process for pattern printing data.

Configuration of Printer Control Processing Device in Relation to Selection Process for Pattern Printing Data The configuration of the print processing system 100 in accordance with the present embodiment is similar to the configuration of the print processing system 100 shown in FIG. 2 of embodiment 1. Description of each device and member is therefore omitted. Meanwhile, from a comparison of embodiment 1 to the present embodiment (embodiment 3), the functional blocks of the printer control processing device 300 in relation to an alteration process of sets of pattern printing data 402 differs in the following point as shown in FIG. 9.

Figure 10:
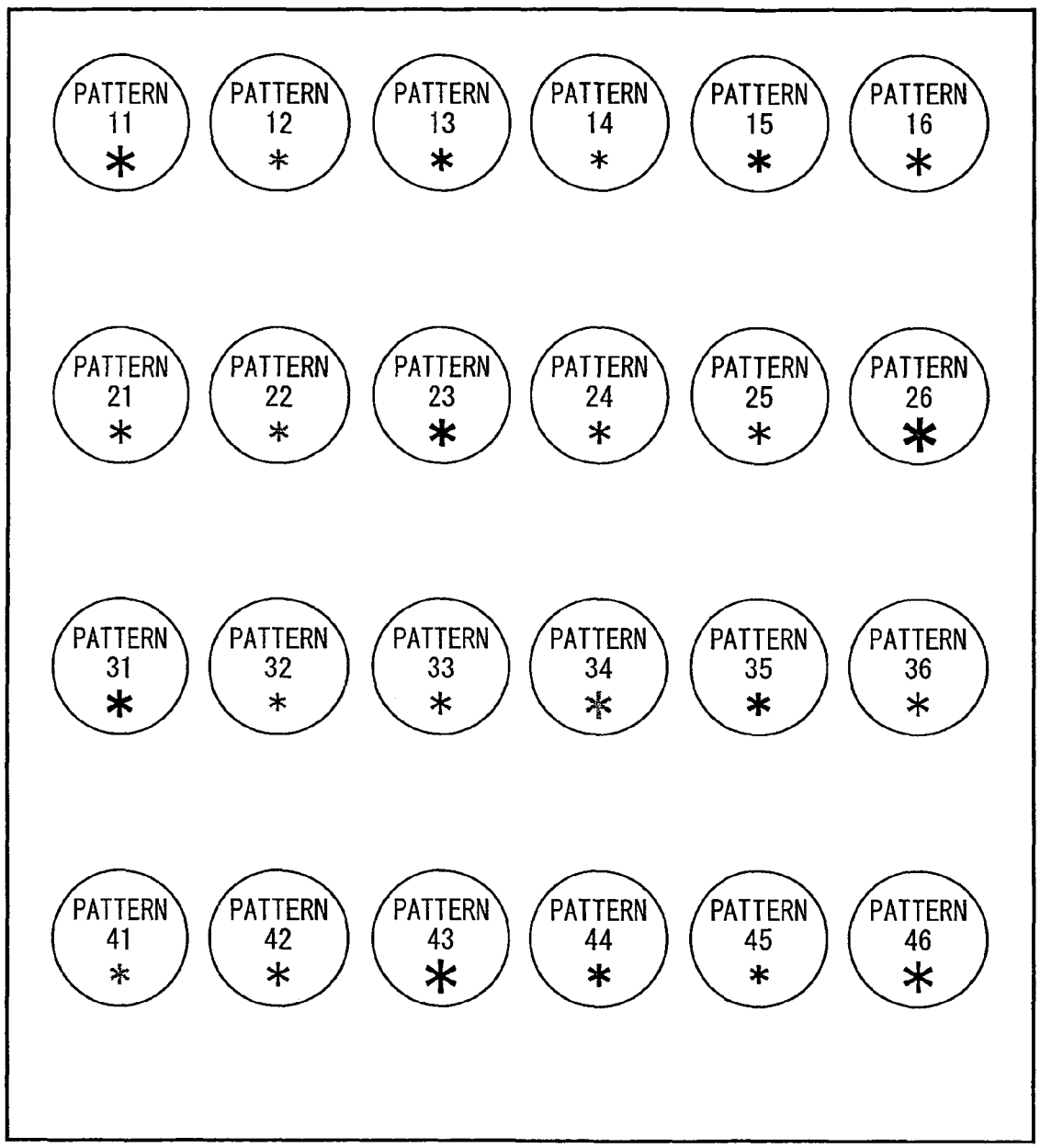
FIG. 10, showing an embodiment of the present invention, is a drawing illustrating an example set of pattern printing data.

In embodiment 1, the pattern printing data 402 contained in the information storage section 400 is of a single type, that is, the pattern printing data 402 to be modified. The sets of pattern printing data 402 in accordance with the present embodiment consists of multiple types of pattern printing data 402 recorded in advance as shown in FIG. 10, which is the difference. In other words, the print processing system 100 in accordance with the present embodiment differs from embodiment 1 in that multiple sets of pattern printing data 402 are recorded in advance so that symbol patterns with different densities, widths of lines, and shapes can be printed.

FIG. 10 shows the concept of symbol patterns stored as the sets of pattern printing data 402. Printing based on these sets of pattern printing data 402 results in printing of the various symbol pattern data shown in FIG. 10.

In addition, in embodiment 1, the printer control processing device 300 includes the pattern modifying section 303. The printer control processing device 300 in accordance with the present embodiment (embodiment 3) differs in that it includes a pattern selecting section 306 in place of the pattern modifying section 303. The recording/retrieving section 305 and the pattern selecting section 306 combine to realize the selecting section.

The pattern selecting section 306 selects the sets of pattern printing data 402 corresponding to the feature values of the symbol patterns having a matching level greater than or equal to the predetermined threshold as a result of the matching level determining section 302 comparing the feature values of the captured symbol patterns to the reference pattern data 401.

Figure 11:
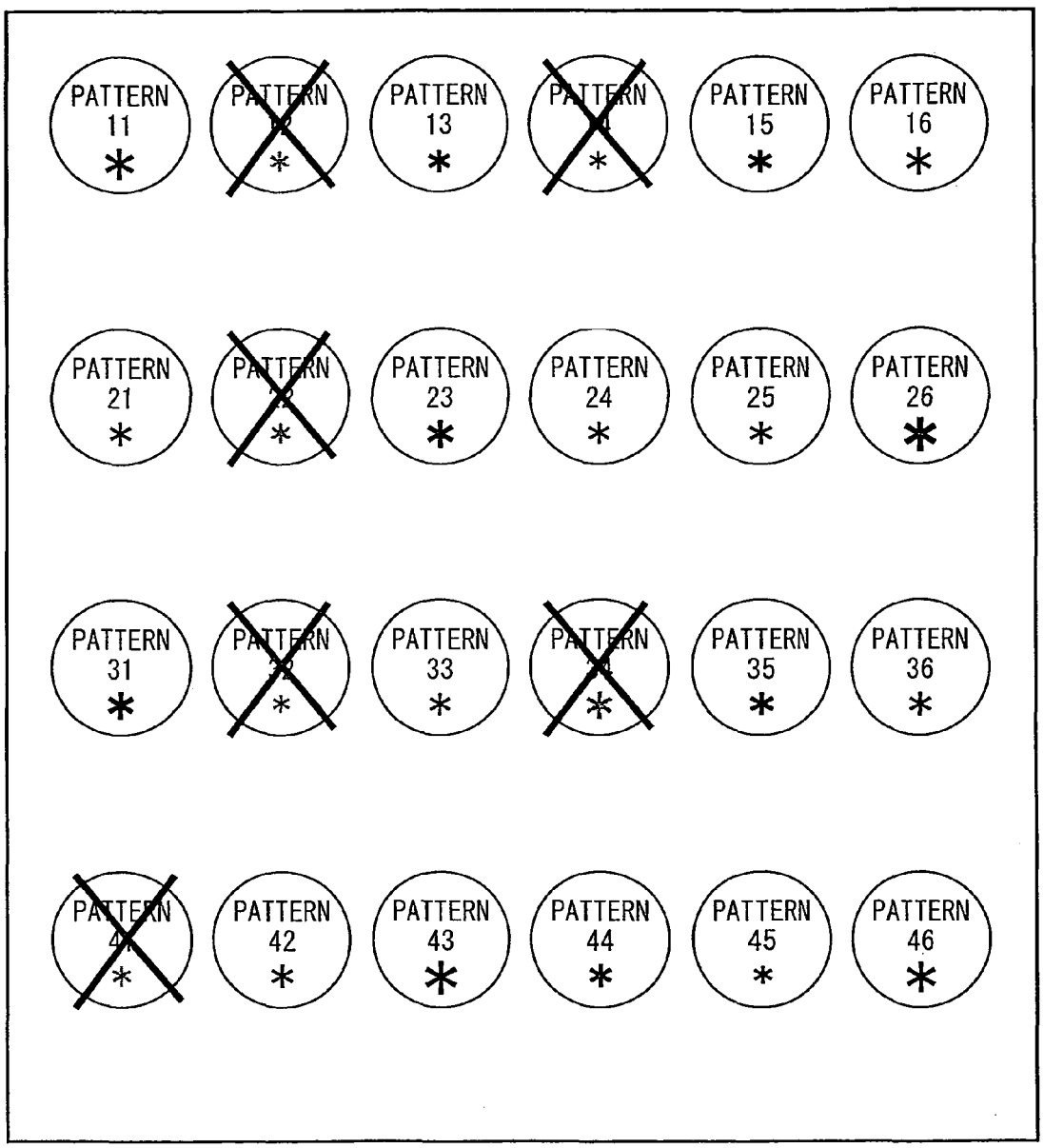
FIG. 11, showing an embodiment of the present invention, is a drawing illustrating a state of pattern printing data after the data is selected by a pattern selecting section in accordance with the present embodiment.

Specifically, as shown in FIG. 11, the pattern selecting section 306 deletes those sets of pattern printing data 402 which have a matching level less than the predetermined threshold with respect to the reference pattern data 401. As a result, those sets of pattern printing data 402 which have a matching level greater than or equal to the predetermined threshold remains recorded in the information storage section 400. FIG. 11 shows that the pattern selecting section 306 has selects sets of pattern printing data 402.

The pattern printing data corresponding to a symbol pattern having a matching level less than the predetermined threshold is selected as follows.

Symbol patterns are printed on respective fixed positions (coordinate positions) on paper. Therefore, it is possible to identify a set of pattern printing data 402 for each feature value extracted from a symbol pattern using this positional information.

To enable the pattern output section 304 to print the sets of pattern printing data 402 in a test process, the recording/retrieving section 305 is instructed to obtain the sets of pattern printing data 402 from the information storage section 400 for output to the print processing device 500. In contrast, to provide a symbol pattern onto a printed material, the pattern output section 304 selects a particular set of pattern printing data 402 from the sets of pattern printing data 402 for output. This is different from the pattern output section 304 of embodiment 1.

As mentioned earlier, the result of image capturing by the image capturing device 200 can vary with the image capturing capability of the image capturing device 200. Therefore, the printer control processing device 300 cannot always identify the pattern from the image data obtained as a result of the image capturing device 200 capturing the pattern print based on one of the sets of pattern printing data 402 prepared in advance.

Accordingly, the print processing system 100 in accordance with the present embodiment is configured to select, from the sets of pattern printing data 402, a set of pattern printing data 402 which can be accurately identified in the result of the image capturing by the image capturing device 200 of the symbol pattern provided onto the printed material.

Figure 12:
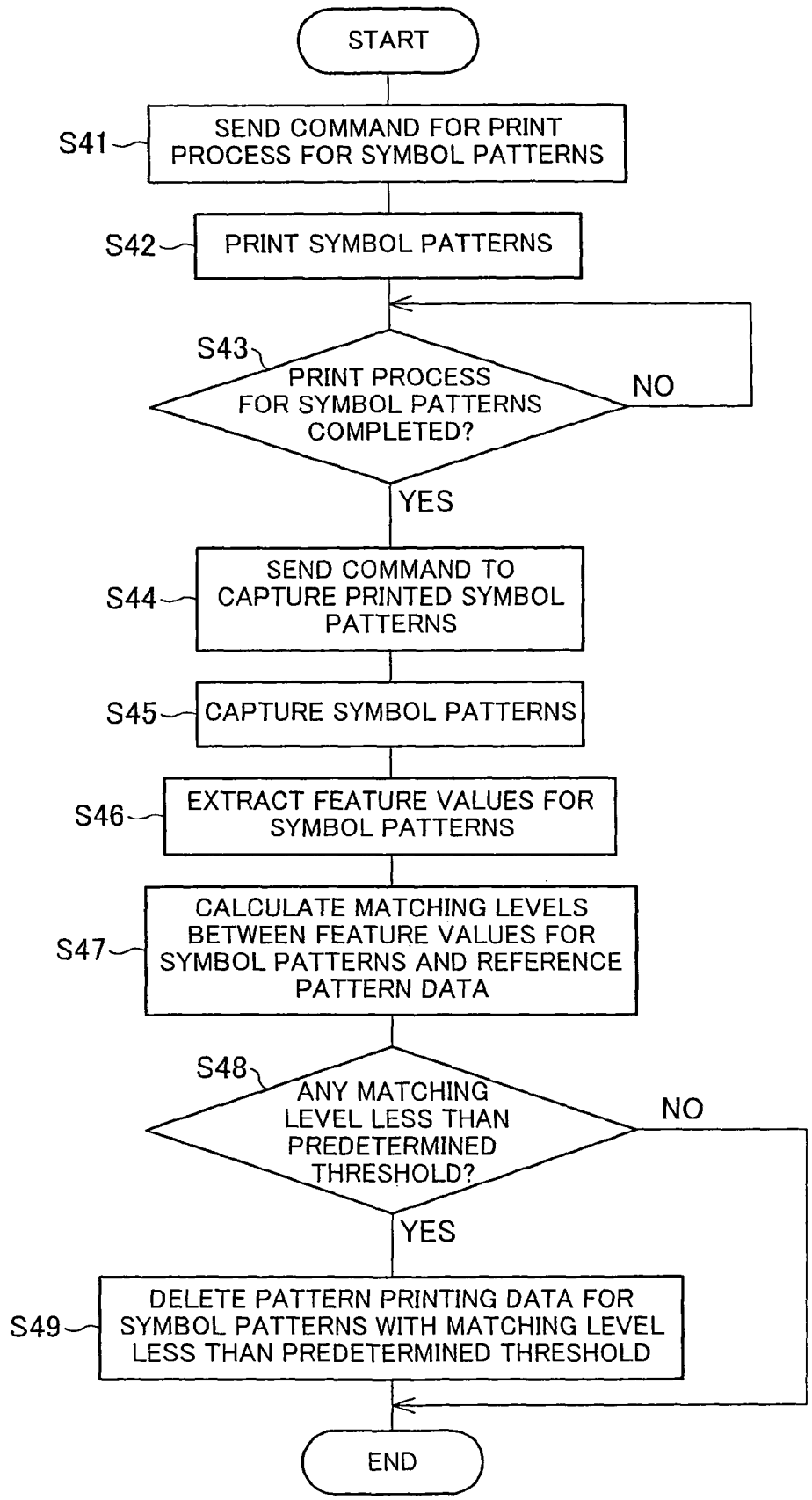
FIG. 12 is a flow chart illustrating a pattern printing data selection process in a print processing system in accordance with the present embodiment.

Referring to FIG. 12, the following will describe a selection process for the pattern printing data 402 in the print processing system 100 in accordance with the present embodiment.

Selection Process for Pattern Printing Data

The print processing system 100 in accordance with the present embodiment performs a selection process for the sets of pattern printing data 402 as a test process prior to an ordinary print process. As mentioned above, it is presumed that the information storage section 400 contains in advance the reference pattern data 401 and the sets of pattern printing data 402. These sets of data are recorded when the printer control processing device 300 is shipped from the factory.

First, the user operates the display operating section 600 to send a print process command for symbol patterns based on the sets of pattern printing data 402. (S41).

In accordance with the command entered through the display operating section 600, the pattern output section 304 in the printer control processing device 300 instructs the recording/retrieving section 305 to retrieve the sets of pattern printing data 402 for output to the print processing device 500. The print processing device 500 then performs a print process for the symbol patterns based on the sets of pattern printing data 402 supplied from the printer control processing device 300 (S42).

If the symbol patterns are printed successfully on paper in this manner based on the respective sets of pattern printing data (YES in S43), the user takes the paper, discharged from the print processing device 500, which now carries the symbol patterns printed on it, and places the paper onto an original document platen (not shown) on the image capturing device 200. The user then operates the display operating section 600 to send a command to capture each symbol pattern (S44). Upon receipt of the image capturing command, the printer control processing device 300 instructs the image capturing device 200 to capture the individual symbol patterns printed on the paper. Then, the image capturing device 200 captures the symbol patterns on the paper and generates image data in accordance with the instruction from the printer control processing device 300. In this manner, the image capturing device 200 captures the symbol patterns on the paper on which the multiple symbol patterns are printed (S45).

As the image capturing device 200 transmits the generated image data to the printer control processing device 300, the pattern extracting section 301 in the printer control processing device 300 extracts the feature values of the symbol patterns based on the received image data (S46). The pattern extracting section 301 then transmits the extracted feature values to the matching level determining section 302.

The matching level determining section 302 compares the feature values of the symbol patterns received from the pattern extracting section 301 to the reference pattern data 401 to calculate a matching level between the feature values of the individual symbol patterns and the reference pattern data 401 (S47). The matching level determining section 302 then determines whether the calculated matching levels are not less than the predetermined threshold (S48). If the levels for all the feature values of the symbol patterns are not less than the predetermined threshold (NO in S48), the printer control processing device 300 terminates the process.

In contrast, if some of the calculated matching levels are less than the predetermined threshold (YES in S48), the matching level determining section 302 instructs the pattern selecting section 306 to delete those sets of pattern printing data 402 which correspond to the symbol patterns with a matching level, with the reference pattern data of the feature values, less than the predetermined threshold from the sets of pattern printing data 402. In accordance with the instruction from the matching level determining section 302, the pattern selecting section 306 deletes those sets of pattern printing data 402 which are specified by the matching level determining section 302 from the sets of pattern printing data 402 (S49).

In this manner, the pattern selecting section 306 stores in the information storage section 400 only those sets of pattern printing data 402 which correspond to the symbol patterns with a matching level, calculated by the matching level determining section 302, greater than or equal to a predetermined threshold.

Further, in the print processing system 100 in accordance with the present embodiment, it is only those sets of pattern printing data 402 for symbol patterns provided onto the printed material which are altered. No image is changed except the symbol pattern provided onto the printed material.

In other words, with no image being changed except the symbol pattern for the printed material, the print processing system 100 can store in a storage device such sets of pattern printing data 402 that the symbol pattern can be reliably identified in the result of the capturing of the symbol pattern by the image capturing device 200.

In addition, the selection process for pattern printing data is configured so that as a result of the image capturing by the image capturing device 200, the pattern printing data 402 corresponding to symbol patterns with an obtained feature value less than a predetermined threshold is deleted.

Figure 13:
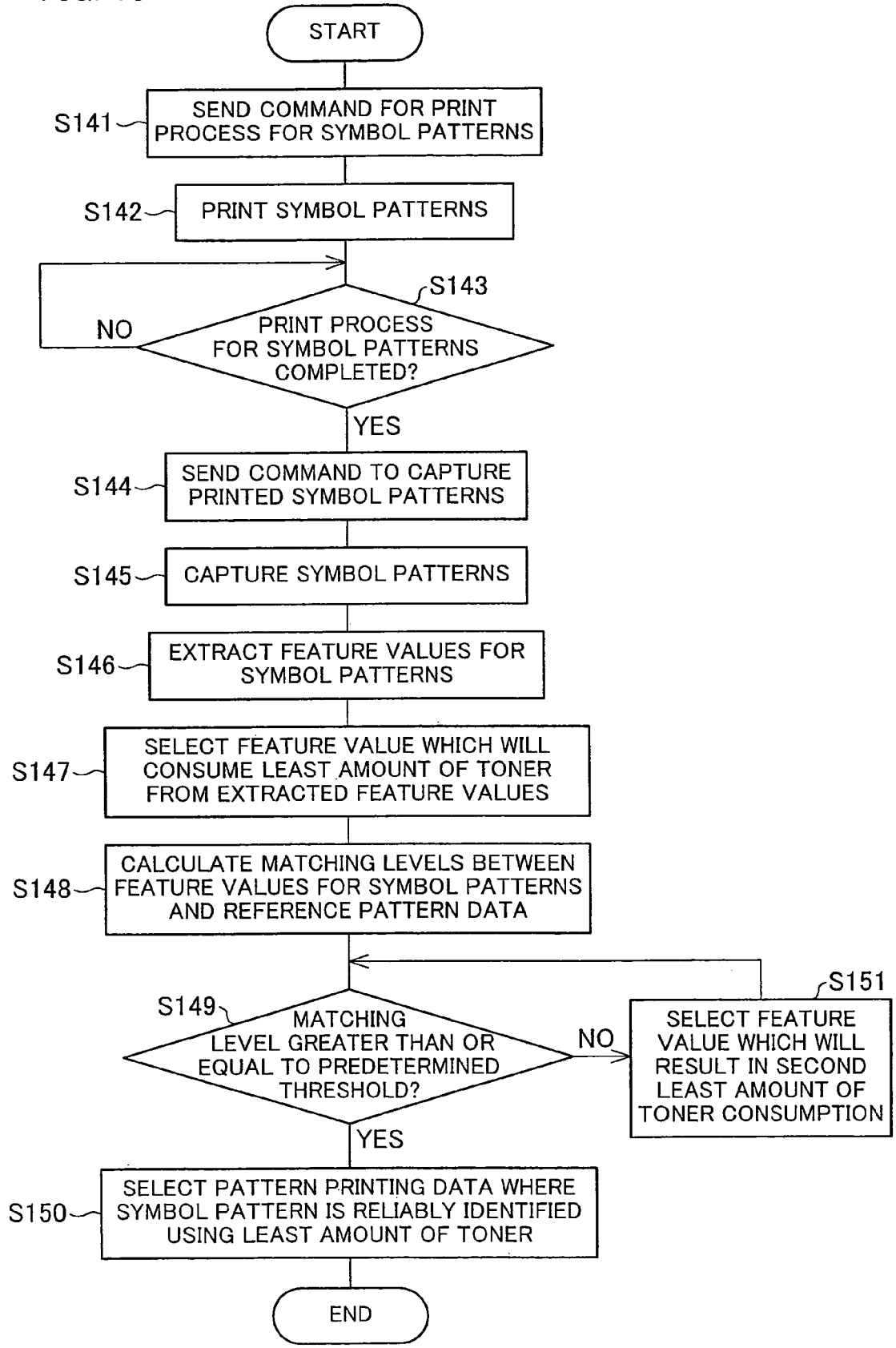
FIG. 13 is a flow chart illustrating a pattern printing data selection process in a print processing system in accordance with the present embodiment.

However, the selection process for the pattern printing data may be configured as in FIG. 13.

Steps S141 to S145 in FIG. 13 are similar to steps S41 to S45 in the selection process for pattern printing data, and its description is omitted.

In step S146, upon receipt of image data for a generated symbol pattern from the image capturing device 200, the pattern extracting section 301 extracts features value for the symbol patterns based on the received image data (S146). Then, the pattern extracting section 301 selects from the extracted feature values a feature value which will consume the least amount of toner and transmits to the matching level determining section 302 (S147). The symbol pattern for the feature value for which the least amount of toner is consumed is a symbol pattern, based on the sets of pattern printing data 402 stored in advance, which results in the lowest print density, the least width of lines, and the smallest shape. Therefore, the toner consumption can be determined from the feature values respectively representing the density, the width of lines, and the size of the shape.

The matching level determining section 302 compares the feature value of the symbol pattern received from the pattern extracting section 301 to the reference pattern data 401 to calculate a matching level between the feature value of the symbol pattern and the reference pattern data 401 (S148). Then, the matching level determining section 302 determines whether the calculated matching level is not less than the predetermined threshold (S149). If the feature value of the symbol pattern is determined to be greater than or equal to the predetermined threshold (YES in S149), the matching level determining section 302 instructs the pattern selecting section 306 to delete the sets of pattern printing data 402 except the pattern printing data 402 corresponding to the symbol pattern from the information storage section 400.

In this manner, only the pattern printing data 402 where a symbol pattern is reliably identified using the least amount of toner is selected (S150) so as to allow the information storage section 400 to store only such pattern printing data 402.

In contrast, if the calculated matching level is less than the predetermined threshold (NO in S149), the matching level determining section 302 instructs the pattern extracting section 301 to transmit a feature value for one of the previously received symbol patterns which will result in the second least amount of toner consumption. Upon receipt of the instruction, the pattern extracting section 301 selects the feature value which will result in the second least amount of toner consumption and transmits to the matching level determining section 302 (S151).

The matching level determining section 302 calculates again a matching level between the received feature value and the reference pattern data 401 and determines whether the matching level is not less than the predetermined threshold (S149). In this manner, steps S149 to S151 are repeated until the matching level becomes greater than or equal to the predetermined threshold.

By this selection process for pattern printing data, the information storage section 400 can store the pattern printing data 402 for a symbol pattern which is reliably identified using the smallest amount of toner.

Therefore, the print processing system 100 in accordance with the present embodiment can provide a symbol pattern for which the toner consume is the lowest and which from the result of image capturing by the image capturing device 200 can be reliably identified.

The symbol patterns printed based on the sets of pattern printing data 402 in accordance with the present embodiment, as mentioned earlier, are printed in a hue which is not visually easy to recognize, that is, (yellow), on paper. This by no means is limiting the print hue. For example, if the paper on which the symbol pattern is printed is always yellow, the symbol pattern may be printed in a difficult-to-recognize hue on that paper (for example, in magenta).

The sets of pattern printing data 402 for printing multiple symbol patterns shown in FIG. 10 may be data for printing in advance symbol patterns in different hues, as well as in multiple densities, widths of lines, and shapes. When this is the case, to allow selection of a hue for the pattern printing data 402, each set of pattern printing data 402 is associated with hue information.

Therefore, when instructed by the user through the display operating section 600 to print a symbol pattern with a designated hue, the pattern output section 304, based on this instruction, can select the pattern printing data 402 with the designated hue from the sets of pattern printing data 402 for output to the print processing device 500.

Alternatively, the pattern printing data 402 corresponding to a symbol pattern with a suitable hue may be selected through the following process in the aforementioned "selection process for pattern printing data."

Figure 14:
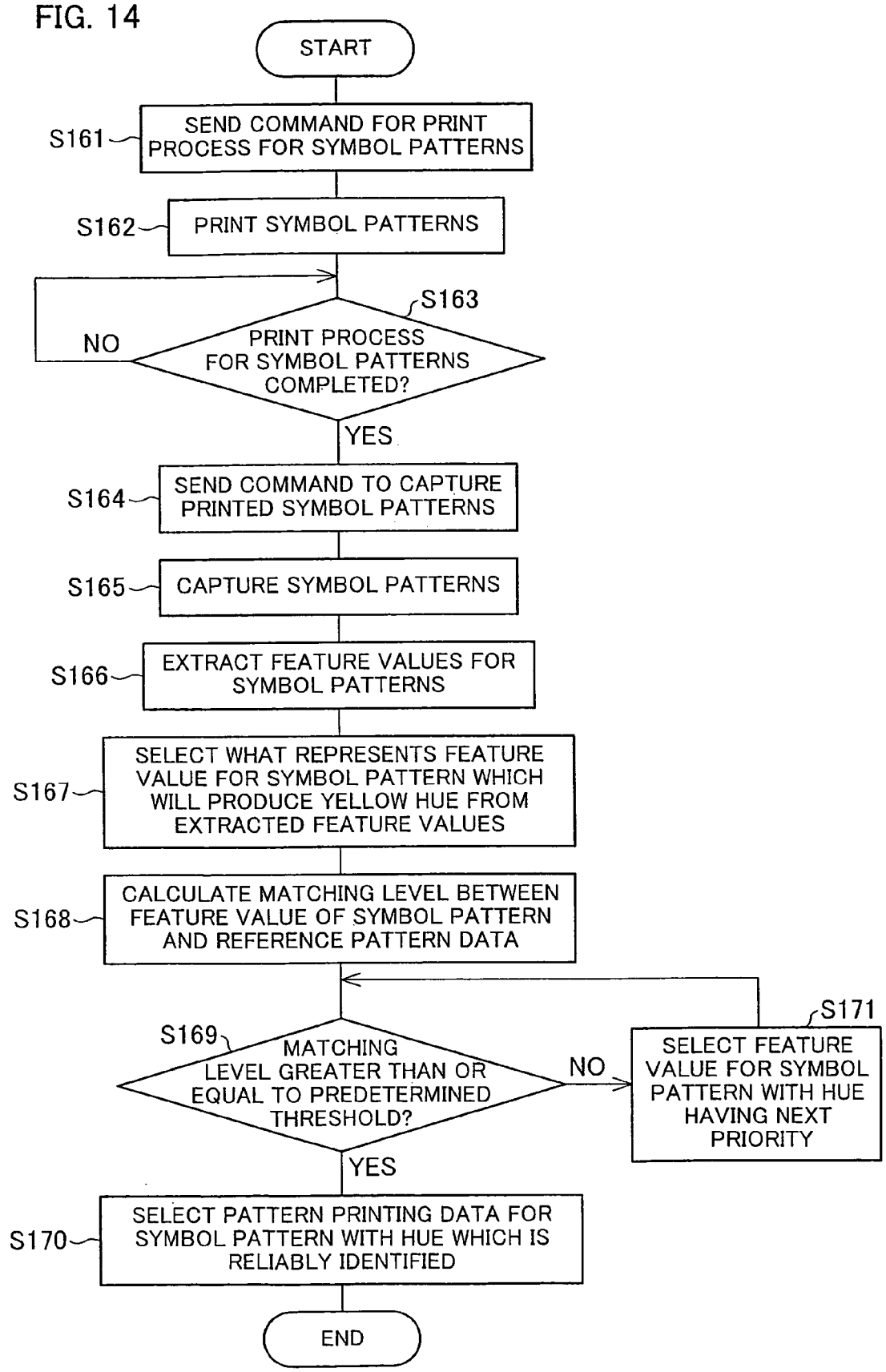
FIG. 14 is a flow chart illustrating a pattern printing data selection process in a print processing system in accordance with the present embodiment.

Different sets of pattern printing data 402 for printing symbol patterns with a yellow, orange, red, magenta, blue, or cyan hue are contained in advance in the information storage section 400. Under these presumptions, a selection process is performed for pattern printing data 402 as shown in FIG. 14. Steps S161 to S165 in FIG. 14 are similar to steps S41 to S45 in the process in FIG. 12, and its description is omitted.

In step S166, upon receipt of image data for generated symbol patterns from the image capturing device 200, the pattern extracting section 301 extracts feature values for the symbol patterns based on the received image data (S166). Then, the pattern extracting section 301 selects from the extracted feature values a feature value for a symbol pattern which will produce a yellow hue and transmits to the matching level determining section 302 (S167). In other words, the printer control processing device 300 transmits feature values to the matching level determining section 302 according to predetermined priority relating to the hues. In the present embodiment, the top hue priority is given to yellow, then, orange, red, magenta, blue, and cyan in descending order.

The matching level determining section 302 compares the feature value of the symbol pattern, indicating a yellow hue, received from the pattern extracting section 301 to the reference pattern data 401 to calculate a matching level between the feature value of the symbol pattern and the reference pattern data 401 (S168). Then, the matching level determining section 302 determines whether the calculated matching level is not less than the predetermined threshold (S169).

If the feature values of the symbol pattern is determined to be greater than or equal to the predetermined threshold (YES in S169), the matching level determining section 302 instructs the pattern selecting section 306 to delete the sets of pattern printing data 402 except the pattern printing data 402 corresponding to the symbol pattern from the information storage section 400.

In this manner, only the pattern printing data 402 with a hue where a symbol pattern is reliably identified is selected (S170) so as to allow the information storage section 400 to store only such pattern printing data 402.

In contrast, if the calculated matching level is less than the predetermined threshold (NO in S169), the matching level determining section 302 instructs the pattern extracting section 301 to transmit a feature value for a symbol pattern with an orange hue. Upon receipt of the instruction, the pattern extracting section 301 selects the feature value for a symbol pattern with an orange hue (second highest priority) and transmits to the matching level determining section 302 (S171).

The matching level determining section 302 calculates again a matching level between the received feature value and the reference pattern data 401 and determines whether the matching level is not less than the predetermined threshold (S169). In this manner, steps S169 to S171 are repeated until the matching level becomes greater than or equal to the predetermined threshold.

In other words, when the paper on which the symbol pattern is printed has a similar color as yellow, the symbol pattern could be indistinguishable due to the color of the paper.

Therefore, when this is the case, the matching level between the feature values obtained as the result of the image capturing of the symbol pattern and the reference pattern data 401 decreases.

Accordingly, if the symbol pattern cannot reliably identified in the result of the image capturing of the symbol pattern with a yellow hue, then, a matching level between a feature value for a symbol pattern with an orange hue and the reference pattern data 401 is compared. In this manner, the feature value of the target to which the reference pattern data 401 is compared is changed from a symbol pattern with a visually harder-to-recognize hue to a symbol pattern with a visually easier-to-recognize hue.

As described in the foregoing, the print processing system 100 in accordance with the present embodiment can select pattern printing data 402 for symbol patterns which can be accurately identified as the result of the image capturing of the symbol pattern in ascending order of ease of visual recognition of the hues, e.g., in the order of yellow, orange, red, magenta, blue, and cyan.

Therefore, when pattern printing data 402 corresponding to a symbol pattern with a more yellowish hue can be selected, pattern printing data 402 for a symbol pattern which is visually difficult-to-recognize and which can be accurately identified in the result of image capturing by the image capturing device 200 can be stored in the information storage section 400.

In addition, it is preferable, as mentioned earlier, if the print processing system 100 in accordance with the present embodiment is configured so that it can provide pattern printing data in accordance with the properties of the paper contained in the individual paper trays 503a to 503c. Further, it is preferable if the system 100 is configured so that it can modify pattern printing data in accordance with the print processing device 500 or degradation of the printed symbol pattern.

Now, as the print processing system 100 configured in this manner, a print processing system 100 in accordance with another embodiment of the present invention will be described in reference FIG. 15 in embodiment 4 below.

Figure 15:
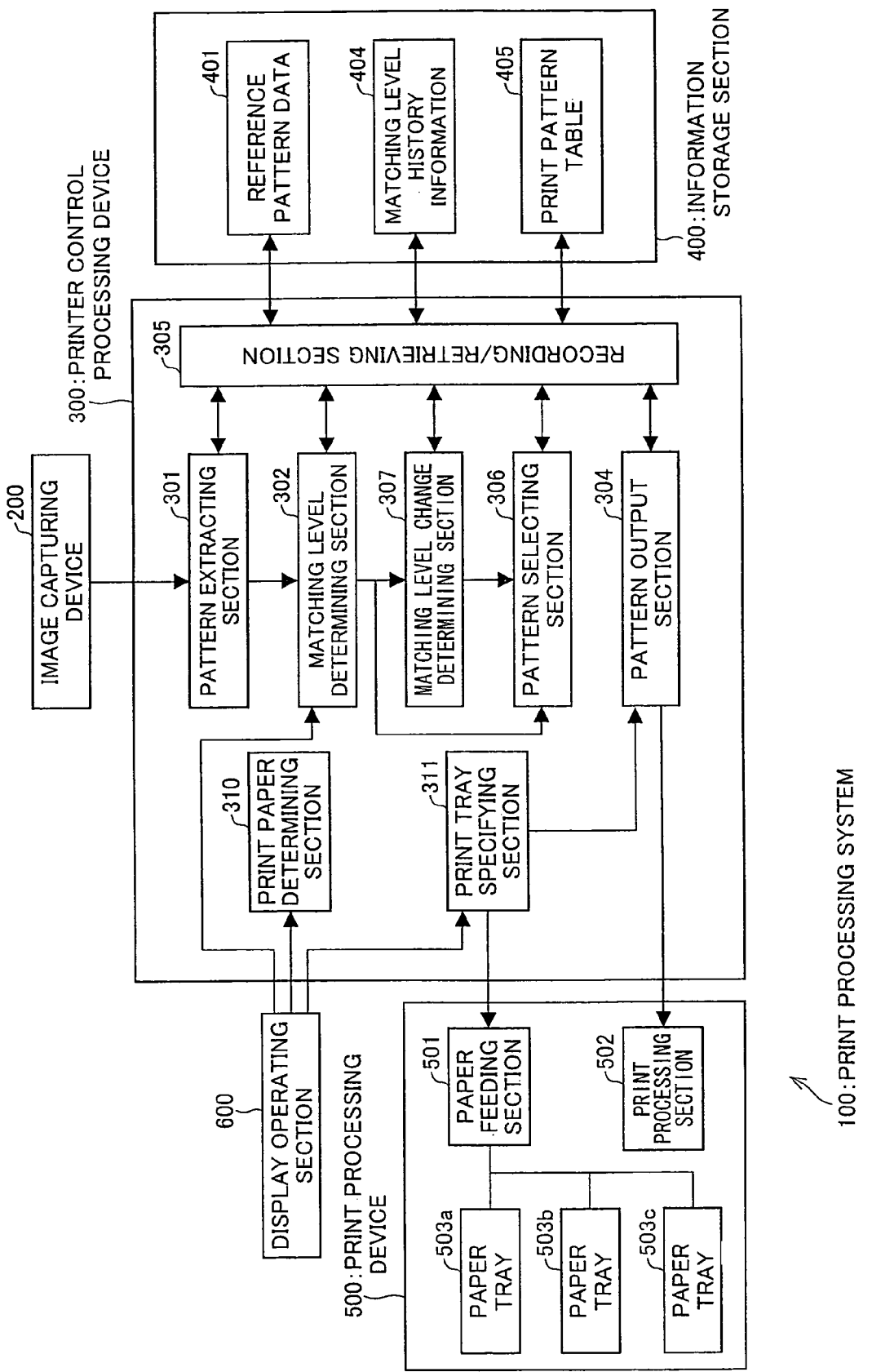
FIG. 15, showing an embodiment of the present invention, is a block diagram illustrating the configuration of a major part of a printer control processing device in relation to a selection process for pattern printing data.

FIG. 15 is a block diagram illustrating the configuration of a printer control processing device in relation to a selection process for pattern printing data in accordance with another embodiment of the present invention.

Embodiment 4

The configuration of the print processing system 100 in accordance with the present embodiment described as another embodiment of the present invention is similar to that of the print processing system 100 described in embodiment 1 shown in FIG. 2. Description of individual devices and members is omitted.

Note however that comparing embodiment 3 to the present embodiment (embodiment 4), the functional blocks in the printer control processing device 300 in relation to the selection process for the sets of pattern printing data 402 are different as shown in FIG. 15.

As shown in FIG. 15, the printer control processing device 300 differs from the printer control processing device 300 of embodiment 3 (see FIG. 9) as follows.

The printer control processing device 300 in accordance with the present embodiment differs in that it includes additional functional block: a matching level change determining section 307, a print paper determining section 310, and a print tray specifying section 311.

In addition, the matching level determining section 302 compares a matching level between the feature value of a captured symbol pattern to the reference pattern data 401 to determine whether the matching level is not less than a predetermined threshold. If the comparison shows that the matching level is greater than or equal to the predetermined threshold, the matching level change determining section 307 is instructed to compare the currently calculated matching level to a previously calculated matching level to determine whether the currently calculated matching level is not less than an expected value obtained from the previously calculated matching level.

If the matching level change determining section 307 determines that the currently calculated matching level is greater than the expected value obtained from the previously calculated matching level, this calculated matching level is added to the matching level history information 404 to store there. This is another difference.

In addition, in accordance with an output instruction for pattern printing data 402 from the print tray specifying section 311, the pattern output section 304 selects pattern printing data 402 in accordance with the paper contained in the paper trays 503a to 503c for output to the print processing device 500. This is a difference from the pattern output section 304 in embodiment 3.

The matching level change determining section 307, the print paper determining section 310, and the print tray specifying section 311 are similar to the matching level change determining section 307, the print paper determining section 310, and the print tray specifying section 311 described in embodiment 2. Description of the individual sections is omitted.

In addition, differences from the information storage section 400 in embodiment 3 are found where the information storage section 400 in accordance with the present embodiment additionally stores matching level history information 404 and, instead of the pattern printing data 402, stores a print pattern table 405 in which the pattern printing data 402 is contained in association with the paper trays 503a to 503c.

The matching level history information 404, as shown in FIG. 6, is history records of the matching levels obtained from comparison of the feature values extracted from the captured symbol pattern to the reference pattern data 401. A separate matching level history is recorded for each set of pattern printing data 402.

Figure 16:
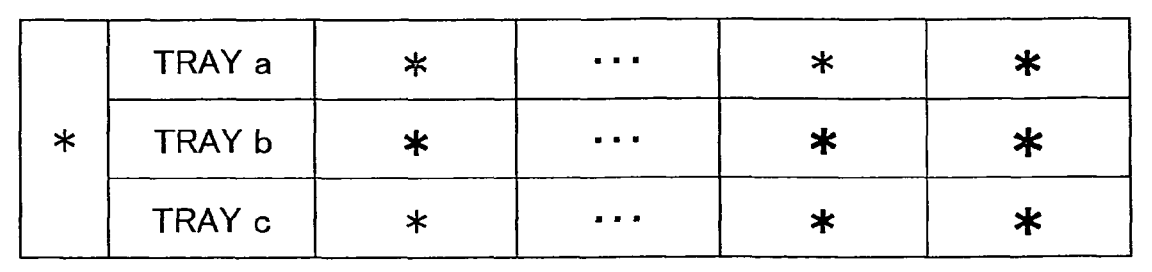

The print pattern table 405 contains sets of pattern printing data 402 for each of the paper trays 503a to 503c as shown in FIG. 16. In the print processing system 100 in accordance with the present embodiment, a type of paper is determined for each paper tray 503a to 503c in advance when the system 100 is shipped from a factory. Therefore, the print pattern table 405 contains sets of pattern printing data 402 in accordance with the types of paper upon the shipment from the factory.

If the types of paper contained in the paper trays 503a to 503c are not determined in advance, and the user decides a type of paper for each paper tray 503a to 503c as they like after the shipment, the print pattern table 405 is generated and stored in the information storage section 400 as follows.

The information storage section 400 contains sets of pattern printing data 402. As in embodiment 3, a set of pattern printing data 402 is selected which results in a symbol pattern which can be accurately identified in the result of the image capturing of the symbol pattern by the image capturing device 200. This selection process is performed in accordance with the print paper contained in the individual paper trays 503a to 503c.

Then, the sets of pattern printing data 402 selected in accordance with these paper trays 503a to 503c are contained in the information storage section 400 as the print pattern table 405 in association with information representing the individual paper trays 503a to 503c.

Although not shown in FIG. 9 in embodiment 3, the print processing device 500 includes a print processing section 502, a paper feeding section 501, and the paper trays 503a to 503c. These print processing section 502, paper feeding section 501, and paper trays 503a to 503c are similar those described in embodiment 2. Description of the individual sections is omitted. In addition, FIG. 15 shows only the paper trays 503a to 503c, this is by no means limiting the number of paper trays. There may be two paper trays or may be more than three of them.

Figure 17:
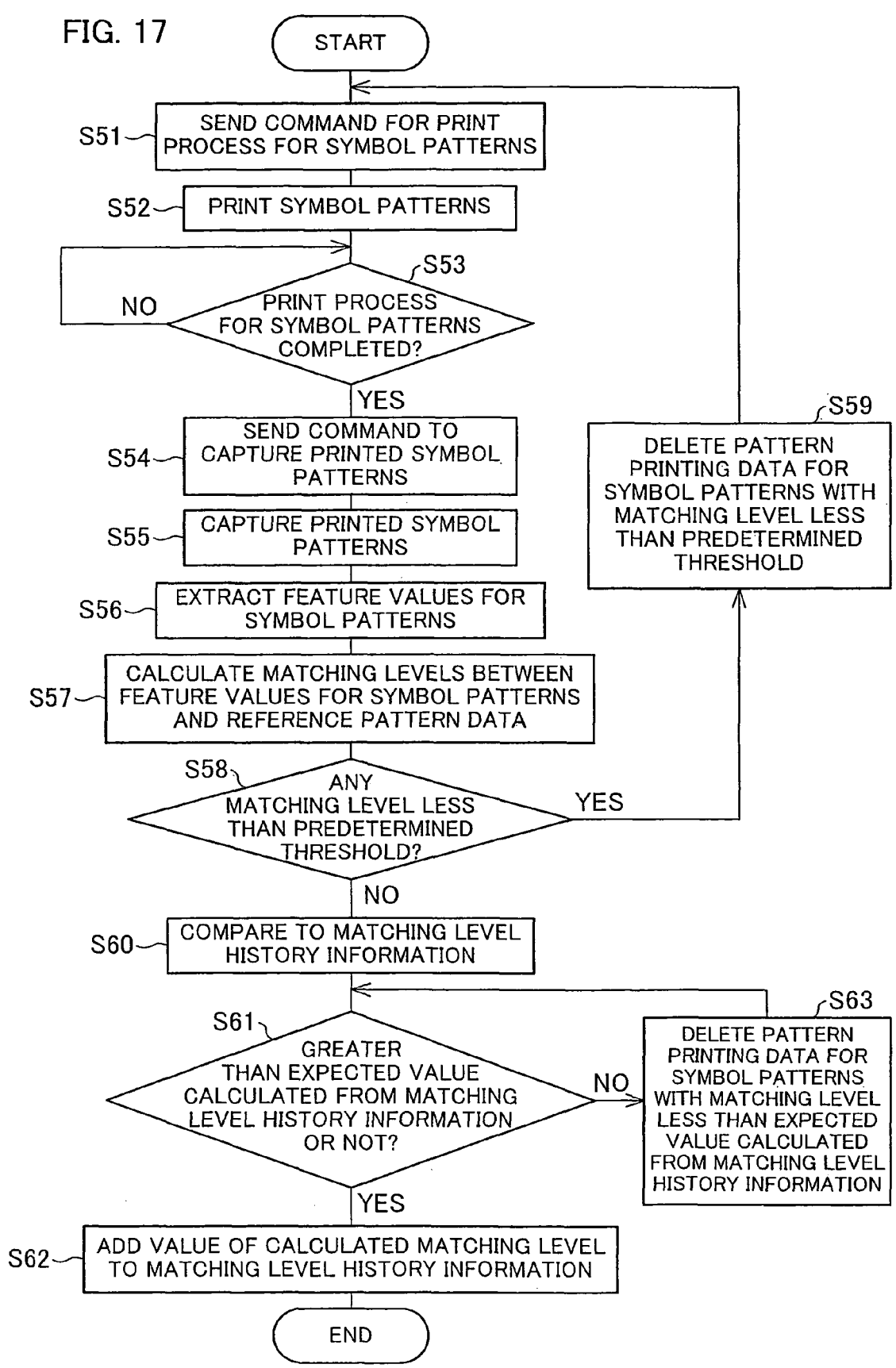
FIG. 17, showing an embodiment of the present invention, is a flow chart illustrating a selection modification process for pattern printing data implemented in accordance with changes in the result of symbol pattern capturing.

Selection Modification Process for Pattern Printing Data in Accordance with Changes in Result of Image Capturing of Symbol Patterns Now, referring to FIG. 17, a selection modification process for pattern printing data 402 will be described. The process is performed in accordance with changes in the result of the image capturing of the symbol patterns which are caused by changes over time of the print processing device 500 or the printed symbol patterns and other factors. FIG. 17 is a flow chart illustrating a selection modification process for the pattern printing data 402 implemented in accordance with changes in the result of the image capturing of the symbol patterns.

It is presumed first here that the information storage section 400 contains the print pattern table 405 which contains the sets of pattern printing data 402 in association with the individual paper trays 503a to 503c. It is also presumed that the information storage section 400 contains, as the matching level history information 404, results of previous calculations of the matching level between the feature values extracted from the captured symbol patterns and the reference pattern data 401. The matching level history contained in the information storage section 400 is separately contained for each set of pattern printing data 402.

It is further presumed that a period has elapsed after an examination of the matching level between the feature values extracted from the captured symbol patterns and the reference pattern data 401 in the print processing system 100 in accordance with the present embodiment.

Under these circumstances, the user specifies one of the paper trays 503a to 503c and sends a command for a print process for the pattern printing data 402 through operation of the display operating section 600 (S51). It is presumed in the operation, the user has specified the paper tray 503a as the paper tray in which the paper on which the symbol patterns will be printed is stored.

In accordance with the user command, the print tray specifying section 311 in the printer control processing device 300 instructs the print processing device 500 to feed paper from the paper tray 503a and instructs the pattern output section 304 to output the sets of pattern printing data 402 corresponding to the paper tray 503a to the print processing device 500. The sets of pattern printing data 402 corresponding to the paper tray 503a are, for example, the sets of pattern printing data 402 stored in association with the tray 503a shown in FIG. 16.

In accordance with the instruction, the print processing device 500 feeds paper from the paper tray 503a. Meanwhile, the pattern output section 304 instructs the recording/retrieving section 305 to retrieve the sets of pattern printing data 402 associated with the paper tray 503a from the print pattern table 405. The section 304 then transmits the retrieved sets of pattern printing data 402 to the print processing device 500.

Upon receipt of the sets of pattern printing data 402, the print processing device 500 prints the symbol patterns on the paper fed from the paper tray 503a (S52). As the print process for the symbol patterns on the paper completes (YES in S53), the user places the paper on which the symbol patterns are now printed onto the original document platen of the image capturing device 200.

Then, the user operates the display operating section 600 to send an image capturing process command to the printer control processing device 300 which in turn instructs the image capturing device 200 to capture image data for the symbol patterns from the paper placed on the plateau (S54).

Upon receipt of the instruction, the printer control processing device 300 instructs the image capturing device 200 to capture the symbol patterns from the paper placed on the original document platen. Upon receipt of the instruction, the image capturing device 200 captures image data for the symbol patterns (S55). Then, the image capturing device 200 transmits the captured image data for the symbol patterns to the printer control processing device 300.

When the user sends to the image capturing device 200 an image capturing command for the paper carrying symbol patterns printed on it, the user enters also information specifying the paper tray 503a in which the paper on which the symbol patterns are printed is stored. The information specifying the paper tray 503a is transmitted to the matching level determining section 302 via the display operating section 600.

In the printer control processing device 300, as the pattern extracting section 301 receives image data for symbol patterns from the image capturing device 200, the section 301 extracts feature values for the symbol patterns based on the image data (S56). Then, the pattern extracting section 301 transmits the extracted feature values of the symbol patterns to the matching level determining section 302.

As the matching level determining section 302 receives the feature values from the pattern extracting section 301, the section 302 calculates a matching level between each feature value and the reference pattern data 401 (S57) and determines whether the calculated matching level reaches the predetermined threshold (S58).

If there is a feature value of a symbol pattern for which the matching level is determined to be less than the predetermined threshold, (YES in S58), the matching level determining section 302 instructs the pattern selecting section 306 to delete the pattern printing data 402 corresponding to the symbol patterns for which the matching level is less than the predetermined threshold from the sets of pattern printing data 402 stored in association with the paper tray 503a (S59). In this manner, the pattern selecting section 306 selects the sets of pattern printing data 402 associated with the paper tray 503a in accordance with an instruction from the matching level determining section 302.

In the selectÿion of the sets of pattern printing data 402 contained in the print pattern table 405, as shown in FIG. 11 in embodiment 3, the pattern selecting section 306 deletes those sets of pattern printing data 402 for which the matching level with respect to the reference pattern data 401 is less than the predetermined threshold. As a result, those sets of pattern printing data 402 which have a matching level greater than or equal to the predetermined threshold remains recorded in the information storage section 400.

In this manner, the printer control processing device 300 in accordance with the present embodiment can store in the information storage section 400 such sets of pattern printing data 402 that the symbol pattern can be reliably identified in the result of the image capturing of the symbol pattern printed on the paper contained in the paper tray 503a.

In contrast, if the matching level determining section 302 determines that the calculated matching level is greater than or equal to the predetermined threshold (YES in S58), the section 302 transmits the calculated matching level to the matching level change determining section 307 and instructs the section 307 to compare it to the previously recorded matching level to determine whether there is any change.

The matching level change determining section 307 instructs the recording/retrieving section 305 to retrieve the matching level history information 404 from the information storage section 400 in accordance with the instruction from the matching level determining section 302 to obtain the matching level history information 404. Then, the matching level change determining section 307 compares the obtained matching level history information 404 to the received matching level (S60) and determines whether the received matching level is greater than an expected value calculated from the matching level history information 404 (S61). The expected value is the value the currently calculated matching level is expected to take as predicted from previous matching levels. In the present embodiment, the expected value is specified to a value greater than the lowest one of the matching levels contained in the matching level history information 404. Therefore, the matching level change determining section 307 compares the currently calculated matching level to the lowest one of the matching levels in the matching level history information 404.

This comparison is performed in terms of the feature values of the symbol patterns printed based on the sets of pattern printing data 402.

If the calculated matching level is determined to be greater than the expected value, that is, the lowest matching level in the matching level history information 404 (YES in S61), the matching level change determining section 307 adds the value of the currently calculated matching level to the matching level history information 404 for storage (S62).

In contrast, if the calculated matching level is determined in step S61 to be less than the expected value, that is, the lowest matching level in the matching level history information 404 (NO in S61), the matching level change determining section 307 instructs the pattern selecting section 306 to delete the pattern printing data 402 corresponding to the calculated matching level value (in association with the paper tray 503a) (S63).

In this manner, the information storage section 400 selectively contains pattern printing data 402 for the symbol patterns which can be reliably identified even if the result of image capturing by the image capturing device 200 changes due to changes over time of the print processing device 500 and the image capturing device 200 and other factors. The selection of the sets of pattern printing data 402 by the pattern selecting section 306 in step S63, although similar to the selection process in step S59, differs as follows.

Differences can be found where in step S63, those sets of pattern printing data 402 for which the calculated feature values are already determined to be greater than or equal to the predetermined threshold in comparison with the reference pattern data 401. Therefore, by implementing further selection processes for the pattern printing data 402 in step S63, the information storage section 400 can record the sets of pattern printing data 402 which result in reliably identifiable symbol patterns even if the image capturing result changes due to the aforementioned changes over time.

As described in the foregoing, the print processing system 100 in accordance with the present embodiment can delete the pattern printing data 402 corresponding to the captured symbol patterns from the pattern printing data 402 stored in advance in the information storage section 400 when the matching level between the reference pattern data 401 and the feature values obtained from the image data for the symbol pattern captured by the image capturing device 200 is less than the predetermined threshold.

In addition, even when the matching level between the feature value obtained from the image data for the captured symbol pattern and the reference pattern data 401 is greater than or equal to the predetermined threshold, if the matching level is lower than the expected value obtained from a previous matching level for the symbol pattern, the pattern printing data 402 corresponding to the symbol pattern can be deleted. Therefore, even when the result of the image capturing of the symbol pattern changes due to changes over time of the print processing device 500, the image capturing device 200, or the printed symbol pattern and other factors, the information storage section 400 can store the pattern printing data 402 for which a symbol pattern can be reliably identified.

In addition, the pattern printing data 402 can be stored in accordance with the properties of the paper contained in the paper trays 503a to 503c. Therefore, even when the result of the capturing of the symbol pattern captured by the image capturing device 200 is different, the information storage section 400 can store pattern printing data 402, in accordance with properties of the paper, for which a symbol pattern can be reliably identified.

In the present embodiment, the expected value is specified to be the lowest one of the matching levels in the matching level history information 404. This is by no means limiting the invention. For example, the expected value may be the average value of the matching levels stored as the matching level history information 404. If there is a tendency that the matching level increases in proportion to the date and time contained in the matching level history information 404, the expected value may be determined from the lastly recorded matching level value with the change ratio being taken into consideration.

In addition, throughout embodiments 1 to 4, symbol patterns instructing for one type of print process control were taken as examples. There may be multiple contents instructing for this print process control and symbol patterns respectively associated with the contents. In other words, as shown in FIG. 18, there may be three types of contents instructing for print process control (e.g., copy allowed, copy prohibited, and secondary copying prohibited), and symbol patterns (●, *, ∇) respectively associated with the control contents.

When this is the case, the pattern extracting section 301 determines as follows, for example, to which of the symbol patterns, ●, *, and ∇, the symbol pattern captured by the image capturing device 200 correspond.

Figure 19:
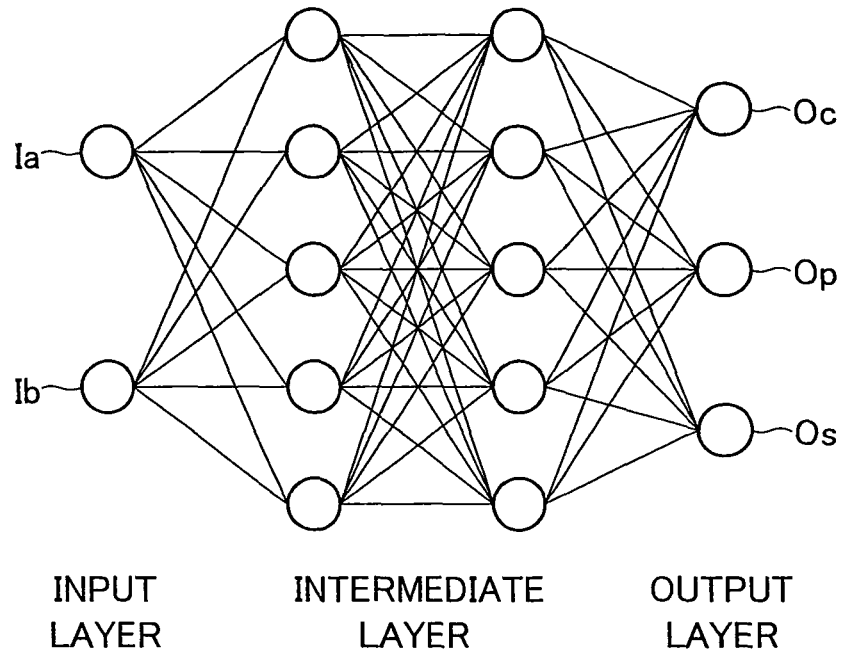
FIG. 19 is a drawing illustrating a neural network model in accordance with the present embodiment.

The determination can be made using a neural network of prelearned four-layered perceptrons shown in FIG. 19. Specifically, for example, the normalized feature value in relation to the density of the individual symbol patterns is input to an input layer Ia. To an input layer Ib, the normalized feature value in relation to the shape (position of the center of gravity) of the individual symbol patterns is input. Then, an output layer Oc learns to obtain a value indicating "copy allowed" as an output value, an output layer Op learns a value indicating "copy prohibited" as an output value, and an output layer Os learns a value indicating "secondary copying prohibited" as an output value.

Figure 20:
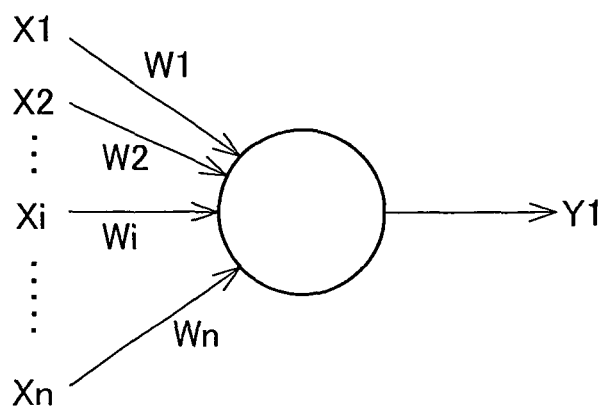
FIG. 20 is a drawing illustrating a relationship between input values and an output value of a neural element in a neural network in accordance with the present embodiment.

In such a neural network, each neural element Ia, Ib in the input layer is connected to the inputs of all elements in the intermediate layer. Each output of the intermediate layer is connected to the inputs of all neural elements Oc, Op, Os in the output layer. In addition, as shown in FIG. 20, each neural element has two or more inputs and one output. The neural element calculates the multiplications and additions as in equation (1) where Xi is the input value to a neural element, Wi is the weight factor for Xi, and Yj is the j-th output value. Then, the result of the calculation, Xj, is used as the input for the sigmoid function in equation (2) to output Yj.

$$xj = \sum_{i=1}^{n} wij \times xi \quad (1)$$

$$yj = f(xj) = \frac{1}{1 + e \times p(-xj)} \quad (2)$$

Then, for example, if the feature values Pa, Pb obtained from symbol patterns indicating "copy allowed" are input to the foregoing neural network, the neural element Oc in the output layer outputs a value close to 1, the neural element Op outputs a value close to 0, and the neural element Os outputs a value close to 0.

If the feature values Pa, Pb obtained from symbol patterns indicating "copy prohibited" are input, the neural element Oc in the output layer outputs a value close to 0, the neural element Op outputs a value close to 1, and the neural element Os outputs a value close to 0.

If the feature values Pa, Pb obtained from symbol patterns indicating "secondary copying prohibited" are input, the neural element Oc in the output layer outputs a value close to 0, the neural element Op outputs a value close to 0, and the neural element Os outputs a value close to 1.

In other words, reference symbol patterns are prepared in advance for the neural network (here, three types: one for a symbol pattern associated with a content indicating "copy prohibited," one for a symbol pattern associated with a content indicating "secondary copying prohibited," and one for a symbol pattern associated with a content indicating "copy allowed").

Then, a two-dimensional feature value is calculated as to the symbol pattern indicating "copy prohibited," for example. The symbol pattern indicating "copy prohibited" is defined as a point plotted from the feature value. A similar operation is carried out on the symbol patterns indicating "secondary copying prohibited" and "copy allowed." Thus, a copy prohibition identifier, a secondary copy prohibition identifier, and a copy permission identifier have three regions for the two-dimensional feature value. Thereafter, the neural network draws boundaries so that the regions become predetermined regions.

In this manner, the pattern extracting section 301 in accordance with the present embodiment can distinguish between symbol patterns of different types using the aforementioned neural network.

Throughout embodiments 1 to 4, the functional blocks in the printer control processing device 300 may be provided to the image capturing device 200 or the print processing device 500, instead of the printer control processing device 300. In other words, when this is the case, the image capturing device 200 or the print processing device 500 has a similar CPU to the printer control processing device 300. The CPU realizes the configuration by loading computer programs from a ROM or the like (not shown) to implement the functional blocks.

Throughout embodiments 1 to 4, the image capturing device 200, the printer control processing device 300, the information storage section 400, and the print processing device 500 respective are individually provided. The printer control processing device 300 may however be provided to the image capturing device 200 or the print processing device 500. When the image capturing device 200 or the print processing device 500 contains the printer control processing device 300 in this manner, the print processing system 100 is arranged from the image capturing device 200, the print processing device 500, and the information storage section 400.

As mentioned above, the print processing system 100 in embodiments 1 to 4 was a system containing the image capturing device 200, the printer control processing device 300, the information storage section 400, the print processing device 500, and the display operating section 600. The system 100 may however be a printer containing these sections.

In embodiments 3 and 4, when there is a symbol pattern whose matching level is determined to be less than the predetermined threshold, the pattern selecting section 306 was configured to delete the pattern printing data 402 corresponding to the symbol pattern less than the predetermined threshold from the sets of pattern printing data 402 (step S49 in FIG. 12 and step S59 in FIG. 17).

In embodiment 4, when the matching level is greater than or equal to the predetermined threshold when compared with the reference pattern data, and the matching level is lower than the lowest matching level in the matching level history information 404 when compared with the matching level history information 404, the pattern selecting section 306 was configured to delete the pattern printing data 402 corresponding to this matching level (step S63 in FIG. 17).

However, the pattern selecting section 306 may be configured to render invalid the pattern printing data 402 corresponding to the symbol pattern whose matching level is less than the predetermined threshold or the pattern printing data 402 corresponding to the symbol pattern whose matching level is lower than the lowest matching level in the matching level history information 404, instead of deleting the pattern printing data 402.

By rendering the pattern printing data 402 invalid data in this manner, the pattern printing data 402 is made temporarily unusable. Then when the result of the print process for the symbol pattern changes, for example, the print processing device 500 is serviced, which improves the print processing capability of the print processing device 500 (restores the device to initial state), the pattern printing data 402 is restored again as being usable.

When the pattern printing data 402 is temporarily rendered invalid in this manner, the number of the sets of pattern printing data 402 contained in advance in the information storage section 400 is not reduced. In other words, candidates which can be used as the pattern printing data 402 can be maintained without being reduced in number.

In addition, in embodiment 2 or 4, types of paper were associated with the paper trays 503a to 503c containing the paper. Any one of the paper trays 503a to 503c may be specified to always contain paper used for test printing of the symbol pattern.

Then, when the symbol pattern is provided onto a print target object for a print process, if the paper to be used in the printing is contained in a different paper tray from the paper tray containing the paper to be used in the test printing, an alert may be output.

Figure 22:
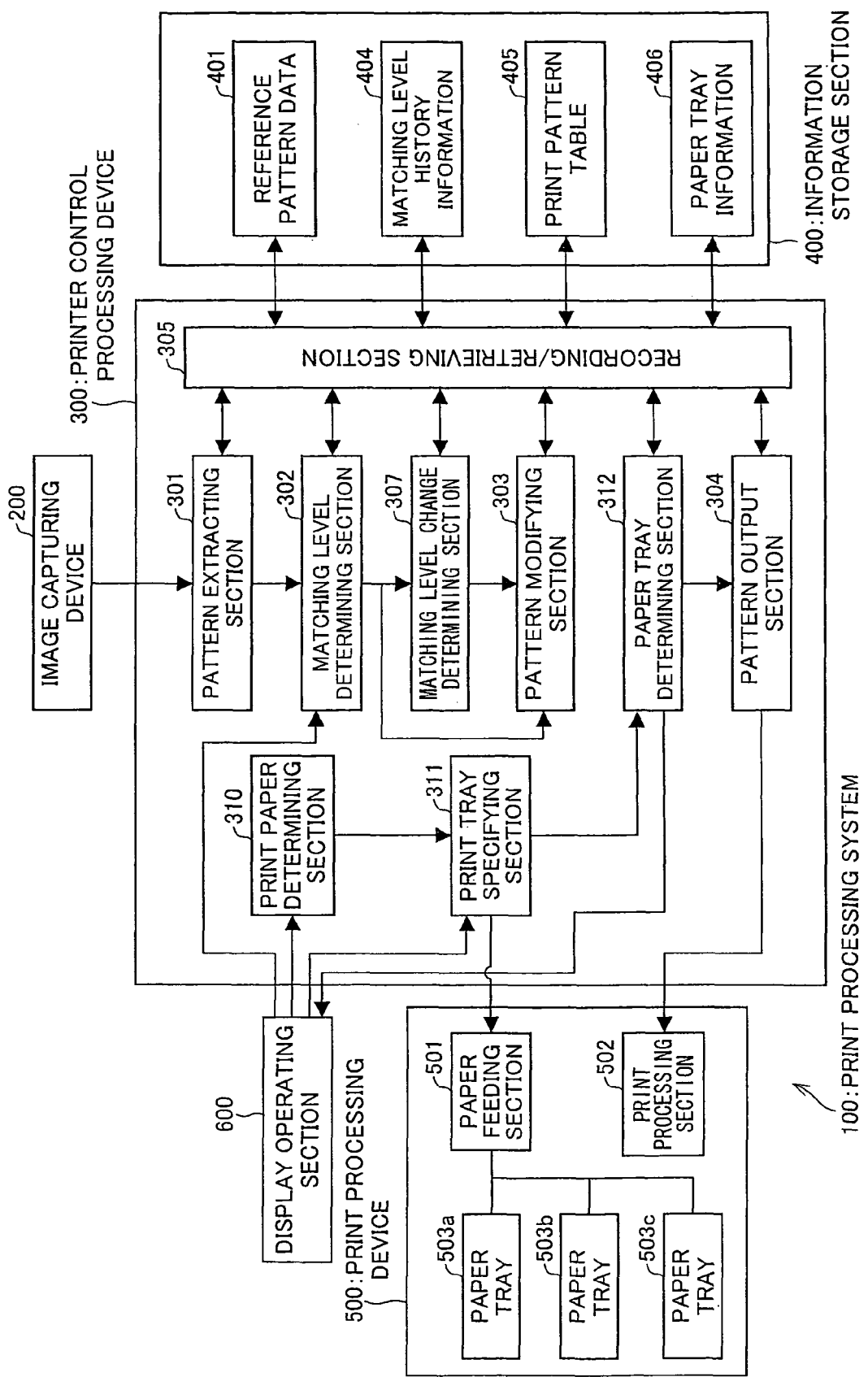
FIG. 22, showing an embodiment of the present invention, is a block diagram illustrating another configuration of an major part of a printer control processing device in relation to a modification process for pattern printing data.
Figure 23:
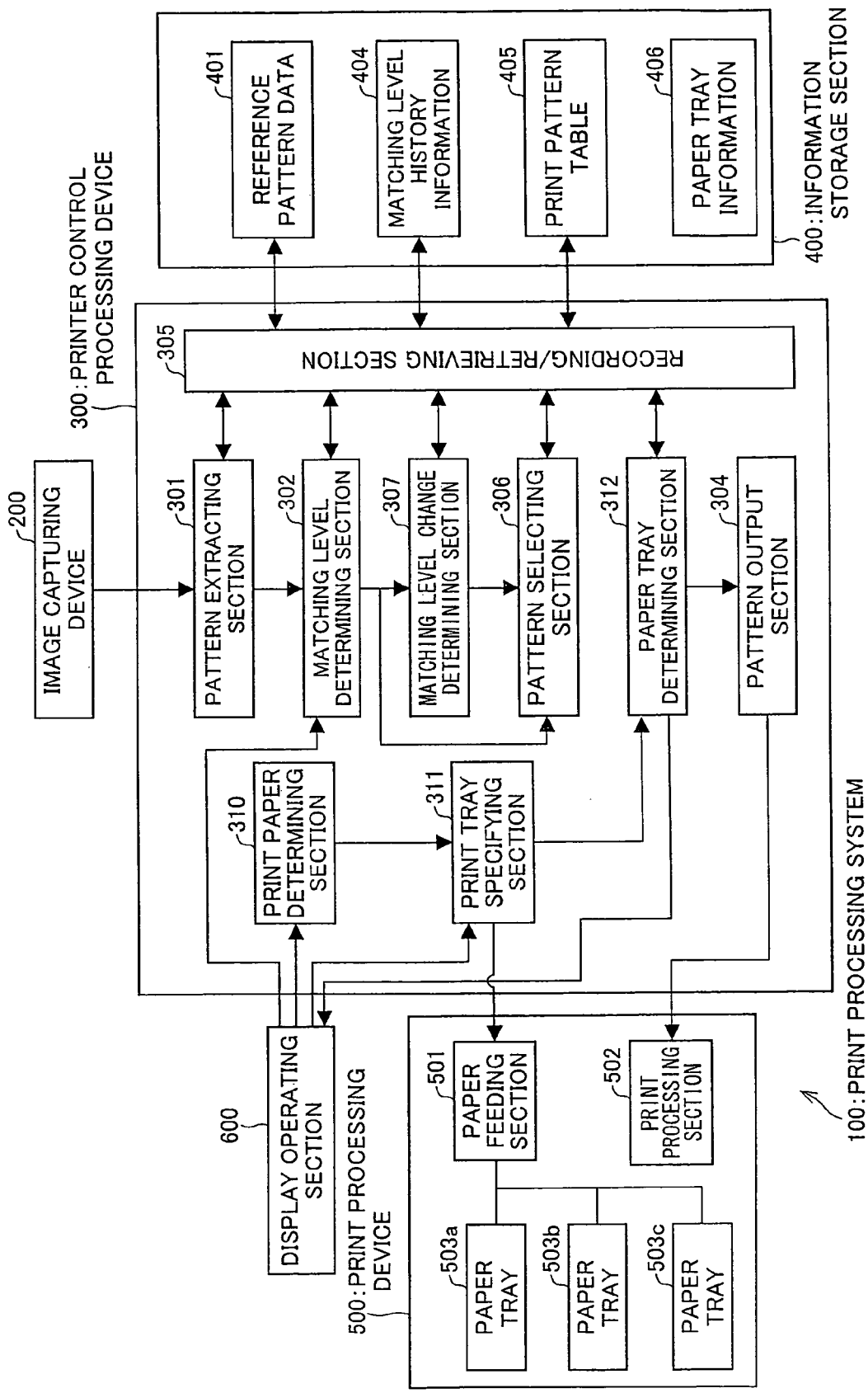
FIG. 23, showing an embodiment of the present invention, is a block diagram illustrating another configuration of an major part of a printer control processing device in relation to a selection process for pattern printing data.

When configured in this manner, in the print processing system 100 in embodiment 2 or 4 above, the information storage section 400 contains further information (paper tray information 406) on a paper tray containing paper for use in test printing as shown in FIGS. 22, 23.

In addition, as shown in FIGS. 22, 23, there is further provided a paper tray determining section 312 determining the paper on which the symbol pattern will be printed, before the printer control processing device 300 selects the pattern printing data 402 and outputs to the print processing device 500.

In other words, the print tray specifying section 311 in the printer control processing device 300 receives information (print-use tray information) specifying one of the paper trays which contains print paper used when the user provides a symbol pattern through the display operating section 600 for a print. The print tray specifying section 311 transmits the received print-use tray information to the paper tray determining section 312.

In accordance with the print-use tray information, in the printer control processing device 300, the paper tray determining section 312 determines whether the print-use tray information matches with the paper tray information 406.

Then, if it is determined not to match, the paper tray determining section 312 outputs information indicating an alert to the display operating section 600.

In other words, suppose, for example, the paper tray containing the paper for use in test printing is the paper tray 503*a*. Then, when the symbol pattern is provided to the print target object for a print, if the symbol pattern is to be print on paper contained in a paper tray other than the paper tray 503*a*, the print processing system 100 displays on the display operating section 600 an alert message prompting to use paper contained in the paper tray 503*a*.

The members in the printer control processing device 300 and the process steps in embodiments 1 to 4 can be realized by a CPU or other computing device executing computer programs contained in a ROM (Read Only Memory), RAM, or other storage device to control a keyboard and other input section, a display and other output section, or an interface circuit or other communications section. Therefore, a computer equipped with these sections can realize various functions and processes of the printer control processing device in embodiments 1 to 4 merely by reading a storage medium containing the computer programs and executing the computer programs. In addition, if the computer program is contained in a removable storage medium, the various functions and processes can be realized on any given computer.

Such a computer program storage medium may be a memory (not shown), such as a ROM, so that the process is executable on a microcomputer. Alternatively, a computer program medium may be used which can be read by inserting the storage medium in an external storage device (program reader device; not shown).

In addition, in either of the cases, it is preferable if the contained computer program is accessible to a microprocessor which will execute the program. Further, it is preferable if the program is read, and the program is then downloaded to a program storage area of a microcomputer where the program is executed. Assume that the program for download is stored in a main body device in advance.

In addition, the program medium is a storage medium arranged so that it can be separated from the main body. Examples of such a program medium include a tape, such as a magnetic tape and a cassette tape; a magnetic disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media hold programs in a fixed manner.

Alternatively, if a system can be constructed which connects to the Internet or other communications network, it is preferable if the program medium is a storage medium carrying the program in a flowing manner as in the downloading of a program over the communications network.

Further, when the program is downloaded over a communications network in this manner, it is preferable if the program for download is stored in a main body device in advance or installed from another storage medium.

As described above, a managing device in accordance with the present invention is characterized in that it manages a result of image capturing by an image capturing device of a pattern, provided onto a printed material, from which information on control of a print process on a print processing device is identified, the managing device including: an obtaining section for obtaining, from a storage device, reference pattern data which provides a reference in identifying the pattern and output pattern data used to print the pattern; a determining section for determining a matching level between the reference pattern data and the result of image capturing, the result of image capturing being produced by the image capturing device of the pattern printed based on the output pattern data; and a modifying section for modifying output pattern data corresponding to a captured pattern if the determining section determines that the matching level is less than a predetermined threshold.

According to the configuration, the output pattern data can be modified if the matching level between the reference pattern data and the result of the image capturing, the result of image capturing being produced by the image capturing device of the pattern printed based on the output pattern data, is determined to be less than a predetermined threshold.

Therefore, the managing device can modify the output pattern data until the pattern can be accurately identified in the result of the image capturing of the pattern by the image capturing device. In other words, the managing device can correct irregularities in the image capturing result caused by the image capturing capability of the image capturing device to generate such output pattern data that the symbol pattern can be reliably identified.

Therefore, the managing device can manage such output pattern data that a pattern can be accurately identified in the result of the image capturing of a pattern by the image capturing device.

The matching level is information indicating how well the information obtained from the result of the image capturing of the pattern matches with the information obtained from an ideal pattern as a pattern based on which information is identified to control a print process. Examples of the information obtained from the result of image capturing are feature values of the captured pattern indicating its shape, hue, etc. Examples of the information obtained from an ideal pattern are feature values of the ideal pattern indicating its shape, hue, etc.

The predetermined threshold is determined so that the difference in the matching level between the result of the image capturing of the pattern data and the reference pattern data is in such a range that the captured pattern can be identified as representing the pattern of the reference pattern.

Another managing device in accordance with the present invention is characterized in that it manages a result of image capturing by an image capturing device of a pattern, provided onto a printed material, from which information on control of a print process on a print processing device is identified, the managing device including: an obtaining section for obtaining, from a storage device, output pattern data which provides a reference in identifying the pattern and which is used to print the pattern; a determining section for determining a matching level between the output pattern data obtained by the obtaining section and the result of image capturing, the result of image capturing being produced by the image capturing device of the pattern printed based on the output pattern data; and a modifying section for modifying output pattern data corresponding to a captured pattern if the determining section determines that the matching level is less than a predetermined threshold.

According to the configuration, if the matching level between the output pattern data and the result of image capturing, the result of image capturing being produced by the image capturing device of the pattern printed based on the output pattern data, is determined to be less than the predetermined threshold, the output pattern data can be modified.

In addition, the managing device in accordance with the present invention modifies the output pattern data per se. It is not configured to regulate the print processing device which affects the entire image on the printed material, such as the regulation of the development bias or charge potential. Thus, the managing device does not change another image printed on the printed material. In other words, the managing device can change for example, the density, width of lines, or hue of the pattern provided onto the printed material without altering the image printed on the printed material.

Therefore, the managing device in accordance with the present invention can modify the output pattern data until the pattern is accurately identified in the result of the image capturing of the pattern by the image capturing device without changing the image other than the pattern printed on the printed material.

Therefore, the managing device in accordance with the present invention can manage such output pattern data that the pattern can be accurately identified in the result of the image capturing of the pattern by the image capturing device without changing the image other than the pattern printed on the printed material.

The managing device in accordance with the present invention may, in the foregoing configuration, further include an output section for outputting the output pattern data modified by the modifying section to the print processing device providing the pattern onto paper based on the output pattern data.

The configuration includes an output section. Therefore, the pattern for which the result of the image capturing of the pattern by the image capturing device can be accurately identified can be provided onto the paper.

The managing device in accordance with the present invention may, in the foregoing configuration, be configured to further include a recording section for recording, in the storage device as matching level history information, a matching level between the reference pattern data and a result of image capturing of a pattern for which the determining section determines that the matching level is greater than or equal to the predetermined threshold; and a comparison section for comparing the matching level between the reference pattern data and the result of the image capturing of the pattern to the matching level history information, wherein the modifying section modifies the output pattern data corresponding to the captured pattern based on a result of comparison by the comparison section.

According to the configuration, the output pattern data corresponding to the captured pattern can be modified based on the result of comparison by the comparison section.

Incidentally, if the printed pattern degrades due to changes in the environment or over time, the matching level between the captured pattern and the reference pattern data decreases in comparison with the history information.

In addition, if the image capturing device which captures a pattern or the print processing device which provides the pattern changes in its image capturing accuracy or the result of its provision due to, for example, changes in the environment or over time, the matching level decreases in comparison with the history information.

Therefore, the managing device in accordance with the present invention, as mentioned above, can manage for future use such output pattern data that the pattern can be accurately identified even if, for example, the printed pattern, the image capturing device which captures the pattern, or the print processing device which provides the pattern changes in terms of the result of the image capturing of the pattern due to environmental changes or over time.

The managing device in accordance with the present invention may, in the foregoing configuration, be configured so that the modifying section modifies any one of width of lines, density, and hue of the output pattern data corresponding to the captured pattern.

According to the configuration, in the managing device in accordance with the present invention, the modifying section can modify any one of the width of lines, density, and hue of the output pattern data. Therefore, the output pattern data can be modified so as to produce such a width of lines, density, or hue that the pattern can be accurately identified in the result of the image capturing of the pattern by the image capturing device.

Therefore, the managing device in accordance with the present invention can manage for future use such output pattern data that the pattern can be accurately identified in the result of the image capturing of the pattern by the image capturing device.

The managing device in accordance with the present invention is preferably configured so that it is provided to a print processing device including multiple paper trays containing paper onto which the pattern will be provided, wherein the modifying section modifies the output pattern data in accordance with the paper trays.

The managing device in accordance with the present invention includes the modifying section. The output pattern data can therefore be modified in accordance with the paper tray providing the pattern.

In other words, output pattern data can be generated to print an accurately identified pattern in accordance with the types of paper contained in the paper trays.

The managing device in accordance with the present invention may be configured to further include a specification section for specifying one of the paper trays which contains paper onto which the pattern will be provided, wherein when the output section outputs the output pattern data, the specification section specifies a predetermined paper tray.

In other words, by containing determined types of paper in predetermined trays, the pattern can always be provided on a predetermined type of paper.

Therefore, irregularities in the result of the image capturing of the pattern due to different types of paper and other differences can be restrained. Thus, an accurately identified pattern can be provided.

Another managing device in accordance with the present invention is characterized in that it manages a result of image capturing by an image capturing device of a pattern, provided onto a printed material, from which information on control of a print process on a print processing device is identified, the managing device including: an obtaining section for obtaining reference pattern data which provides a reference in identifying the pattern and multiple sets of output pattern data used to provide a pattern onto a printed material from a storage device containing the data in advance; a determining section for determining a matching level between the reference pattern data and the result of image capturing, the result of image capturing being produced by the image capturing device of the pattern printed based on the output pattern data; and a selecting section for rendering valid only output pattern data, contained in the storage device, which corresponds to a pattern for which the determining section determines that the matching level is greater than or equal to a predetermined threshold.

According to the configuration, if the matching level between the reference pattern data and the result of image capturing, the result of image capturing being produced by the image capturing device of the pattern printed based on the multiple sets of output pattern data, is determined to be less than a predetermined threshold, only the output pattern data which corresponds to the pattern for which the matching level with respect to the reference pattern data is determined to be greater than or equal to the predetermined threshold can be rendered valid out of the multiple sets of output pattern data.

Therefore, the managing device in accordance with the present invention can manage such output pattern data that a pattern can be accurately identified.

The managing device in accordance with the present invention, in the foregoing configuration, is preferably configured so that it further includes an output section for outputting output pattern data, rendered valid by the selecting section, for a pattern provided onto a printed material.

The configuration includes an output section. Therefore, such output pattern data that the pattern can be reliably identified in the result of the image capturing of the pattern by the image capturing device can be output.

Therefore, the managing device in accordance with the present invention can provide onto paper the pattern for which the result of the image capturing of the pattern by the image capturing device can be accurately identified.

The managing device in accordance with the present invention may, in the foregoing configuration, be configured to further include: a recording section for recording, in the storage device as matching level history information, a matching level of output pattern data corresponding to a pattern for which the determining section determines that the matching level is greater than or equal to the predetermined threshold; and a comparison section for comparing the matching level between the reference pattern data and the result of image capturing of the pattern to the matching level history information contained in the storage device, wherein the selecting section selects, based on a result of comparison by the comparison section, whether the output pattern data the corresponding to the captured pattern is valid or invalid.

According to the configuration, the selecting section can select, based on the matching level history information, whether the matching level between the reference pattern data and the result of the image capturing of the pattern is valid or invalid.

Incidentally, if the printed pattern degrades due to changes in the environment or over time, the matching level between the captured pattern and the reference pattern data decreases in comparison with the history information.

In addition, if the image capturing device which captures a pattern or the print processing device which provides the pattern changes in its image capturing accuracy or the result of its provision due to, for example, changes in the environment or over time, the matching level decreases in comparison with the history information.

Therefore, the managing device in accordance with the present invention, as mentioned above, can manage for future use such output pattern data that the pattern can be accurately identified even if, for example, the printed pattern, the image capturing device which captures the pattern, or the print processing device which provides the pattern changes in terms of the result of the image capturing of the pattern due to environmental changes or over time.

The managing device in accordance with the present invention may, in the foregoing configuration, be configured so that the selecting section renders valid output pattern data with a maximum matching level in output pattern data with a greater matching level with respect to the reference pattern data than the output pattern data corresponding to the captured pattern.

According to the configuration, the managing device in accordance with the present invention includes the selecting section. Therefore, the output pattern data with the greatest matching level with respect to the reference pattern data can be selected.

Therefore, the output pattern data with the smallest decrease in the matching level can be recorded even if the pattern provided onto the printed material degrades due to changes in the environment of the printed material or over time, or if the image capturing device which captures the pattern changes in terms of image capturing accuracy due to changes in the environment of the image capturing device or over time.

Therefore, the managing device in accordance with the present invention can manage for future use such output pattern data that the pattern can be accurately identified even if, for example, the printed pattern, the image capturing device which captures the pattern, or the print processing device which provides the pattern changes in terms of the result of the image capturing of the pattern due to environmental changes or over time.

The managing device in accordance with the present invention may, in the foregoing configuration, be configured to further include an extraction section for extracting feature information indicating features of patterns from the result of image capturing by the image capturing device of patterns printed based on the multiple sets of output pattern data, for transmission to the determining section, wherein the determining section determines a matching level between the reference pattern data and the feature information received from the extracting section.

According to the configuration, the extraction section can extract the feature information of the patterns and therefore notify the determining section of the feature information of the patterns.

The feature information is feature values obtained from, for example, the print density, hue, width of lines, and/or shape (position of the center of gravity) of the patterns obtained as a result of the image capturing of the patterns.

Therefore, the determining section can carry out the comparison with respect to the reference pattern data using quantitative information.

The managing device in accordance with the present invention may, in the foregoing configuration, be configured so that: the extraction section determines an amount of toner consumed based on the extracted feature information when the patterns are printed and provided, and preferentially transmits feature information for which a smaller amount of toner is consumed to the determining section; and the extraction section sequentially transmits the feature information to the determining section until the determining section determines that the matching level between the reference pattern data and the feature information received from the extraction section is greater than or equal to a predetermined threshold.

According to the configuration, the extraction section preferentially transmits feature information for which a smaller amount of toner is consumed in a print process to the determining section. In addition, the feature information is transmitted until the determining section determines that the matching level between the reference pattern data and the feature information received from the extraction section is greater than or equal to the predetermined threshold.

Therefore, the pattern which consumes the smallest amount of toner can be selected from the patterns which can be accurately identified in the result of image capturing by the image capturing device.

The managing device in accordance with the present invention may, in the foregoing configuration, be configured so that: the patterns printed based respectively on the multiple sets of output pattern data stored in advance into the storage device have mutually different hues; the extraction section determines hues printed on paper in a print process for the patterns based on the extracted feature information and transmits the feature information to the determining section in accordance with the hues; the extraction section sequentially transmits the feature information to the determining section until the determining section determines that the matching level between the reference pattern data and the feature information received from the extraction section is greater than or equal to a predetermined threshold.

According to the configuration, the extraction section transmits the feature information for the patterns with different print hues to the determining section. Therefore, the output pattern data for a pattern which can be reliably identified in accordance with the hue of the print paper in the result of image capturing by the image capturing device can be selected.

Therefore, the pattern can be provided which can be reliably identified in the result of image capturing by the image capturing device without being affected by the hue of the paper on which the pattern will be printed.

The managing device in accordance with the present invention may, in the foregoing configuration, be preferably configured so that the extraction section transmits the feature information to the determining section in order of hues from the visually least distinguishable to the visually most distinguishable when the patterns are printed and provided onto paper.

According to the configuration, the extraction section transmits in the order of hues from the visually least distinguishable to the visually most distinguishable when the patterns are printed and provided onto paper. Therefore, the patterns are difficult to recognize even when the patterns are provided overlapping another printed part.

Therefore, the user can recognize the printed part without the printed part being visually disrupted by the provided pattern.

Therefore, the managing device in accordance with the present invention can manage the output pattern data for which the pattern does not visually disrupt the other printed part and can be accurately identified.

In addition, the managing device in accordance with the present invention may be preferably configured so that provided to a print processing device including multiple paper trays containing paper onto which the patterns will be provided, the selecting section selects whether to render the output pattern data valid or invalid in accordance with the paper trays.

The managing device in accordance with the present invention includes the selecting section. Therefore, it can be selected whether to render the output pattern data valid or invalid in accordance with the paper trays to which the patterns are provided.

In other words, output pattern data from which an accurately identified pattern can be printed can be selected in accordance with the types of paper in the paper trays.

The managing device in accordance with the present invention may be configured to further include a specification section for specifying one of the paper trays which contains paper onto which the patterns will be provided, wherein when the output section outputs the output pattern data, the specification section specifies a predetermined paper tray.

In other words, by containing determined types of paper in predetermined trays, the pattern can always be provided on a predetermined type of paper.

Therefore, irregularities in the result of the image capturing of the pattern due to different types of paper and other differences can be restrained. Thus, an accurately identified pattern can be provided.

The managing device in accordance with the present invention may, in the foregoing configuration, be preferably configured so that the storage device stores in advance paper tray information specifying a paper tray containing paper onto which the pattern will be provided in a test printing where the result of image capturing by the image capturing device of the pattern is examined; the managing device further includes: an input section for inputting print paper tray specifying information specifying a paper tray containing paper onto which the patterns will be provided when the patterns are to be provided onto a printed material; and a paper tray determining section for comparing the print paper tray information input by the input section to the paper tray information contained in the storage device and determining whether the print paper tray information matches with the paper tray information; the paper tray determining section outputs information indicating an alert if the paper tray determining section determines that the print paper tray information does not match with the paper tray information.

According to the configuration, the managing device in accordance with the present embodiment includes the paper tray determining section. Therefore, the managing device can determine whether the paper used for a test printing of the patterns matches with the print paper on which the patterns are printed.

It is better if the paper used for the test printing matches with the paper where the pattern is actually provided and printed on a printed material for the following reasons.

If it matches, the patterns are provided onto the same type of paper in the test printing and the ordinary print process. No irregularities occur in the result of image capturing of the pattern. In other words, if the pattern printing data for a pattern which can be accurately identified in the test printing is obtained, the pattern can be accurately identified also in the result of the provision of the pattern onto the same paper as the paper used in the test printing.

In addition, if the paper tray determining section determines that the print paper tray information does not match with the paper tray information, information indicating an alert can be output.

Therefore, the managing device can alert the user to provide the patterns onto the same type of paper as the paper used in the test printing. Irregularities in the result of image capturing which are caused by in accordance with the type of paper can be prevented.

The print processing system in accordance with the present invention, to achieve the objectives, is characterized in that it includes a print processing device for providing a pattern onto a printed material based on output pattern data; an image capturing device for capturing the pattern; and the foregoing managing device.

Therefore, the print processing system can accurately control a print process based on the pattern provided onto the printed material, because the managing device can manage such output pattern data that a pattern can be accurately identified in the result of the image capturing of the pattern by the image capturing device.

A method of controlling a managing device in accordance with the present invention, to achieve the objectives, is characterized in that it is a method of controlling a managing device for managing a result of image capturing by an image capturing device of a pattern, provided onto a printed material, from which information on control of a print process on a print processing device is identified, the method including the steps of: (a) obtaining, from a storage device, reference pattern data which provides a reference in identifying the pattern and output pattern data used to provide the pattern onto the printed material; (b) determining a matching level between the reference pattern data and the result of image capturing, the result of image capturing being produced by the image capturing device of the pattern provided onto the printed material based on the output pattern data; and (c) modifying output pattern data corresponding to a captured pattern if it is determined in step (b) that the matching level is less than a predetermined threshold.

According to the method, if the matching level between the reference pattern data and the result of image capturing, the result of image capturing being produced by the image capturing device of the pattern printed based on the output pattern data, is determined to be less than a predetermined threshold, the output pattern data can be modified.

Therefore, the method of controlling a managing device can modify the output pattern data until the pattern is reliably identified in the result of the image capturing of the pattern by the image capturing device.

Therefore, the managing device can generate such output pattern data that the pattern can be accurately identified in the result of the image capturing of the pattern by the image capturing device.

Therefore, the method of controlling a managing device in accordance with the present invention can manage for future use such output pattern data that the pattern can be accurately identified in the result of the image capturing of the pattern by the image capturing device.

Another method of controlling a managing device in accordance with the present invention, to achieve the objectives, is characterized in that it is a method of controlling a managing device for managing a result of image capturing by an image capturing device of a pattern, provided onto a printed material, from which information on control of a print process on a print processing device is identified, the method including the steps of: (a) obtaining, from a storage device, output pattern data which provides a reference in identifying the pattern and which is used to print the pattern; (b) determining a matching level between the output pattern data obtained by the obtaining section and the result of image capturing, the result of image capturing being produced by the image capturing device of the pattern printed based on the output pattern data; and (c) modifying output pattern data corresponding to a captured pattern if it is determined in step (b) that the matching level is less than a predetermined threshold.

Therefore, the method of controlling a managing device in accordance with the present invention can manage for future use such output pattern data that the pattern can be accurately identified in the result of the image capturing of the pattern by the image capturing device.

Therefore, the managing device can generate such output pattern data that the pattern can be accurately identified in the result of the image capturing of the pattern by the image capturing device.

Therefore, the method of controlling a managing device in accordance with the present invention can manage for future use such output pattern data that the pattern can be accurately identified in the result of the image capturing of the pattern by the image capturing device.

Another method of controlling a managing device in accordance with the present invention is characterized in that it is a method of controlling a managing device for managing a result of image capturing by an image capturing device of a pattern, provided onto a printed material, from which information on control of a print process on a print processing device is identified, the method including the steps of: (a) obtaining reference pattern data which provides a reference in identifying the pattern and multiple sets of output pattern data used to provide a pattern onto a printed material from a storage device containing the data in advance; (b) determining a matching level between the reference pattern data and the result of image capturing, the result of image capturing being produced by the image capturing device of a pattern provided onto a printed material based on the output pattern data; and (c) rendering valid only output pattern data, contained in the storage device, which corresponds to a pattern for which it is determined in step (b) that the matching level is greater than or equal to a predetermined threshold.

According to the method, if the matching level between the reference pattern data and the result of image capturing, the result of image capturing being produced by the image capturing device of the pattern printed based on the multiple sets of output pattern data, is determined to be less than a predetermined threshold, only the output pattern data which corresponds to the pattern for which the matching level with respect to the reference pattern data is determined to be greater than or equal to the predetermined threshold can be rendered valid out of the multiple sets of output pattern data.

Therefore, the method of controlling a managing device in accordance with the present invention can manage for future use such output pattern data that the pattern can be accurately identified in the result of the image capturing of the pattern by the image capturing device.

The sections of the managing device may be realized on a computer. When this is the case, the present invention encompasses a computer-readable storage medium containing a managing-device-controlling computer program which causes the computer to realize a managing device by operating the computer as those sections.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The print processing system 100 in accordance with the present embodiment can provide such pattern printing data that a symbol pattern can be reliably identified in a result of image capturing by an image capturing device. Hence, the system 100 can be widely applied to capture a particular symbol pattern with various image capturing devices to use information associated with the symbol pattern.

What is claimed is:

1. A managing device for managing data of a result of image capturing, comprising:
the image capturing being performed by an image capturing device so as to capture a print pattern, provided onto a printed material, and the data of the result of the image capturing indicates the result of the image capturing and is sent from the image capturing device to the managing device, the print pattern being constituted by one or more symbols and being associated with information on a predetermined control of a print process on a print processing device,
the managing device comprising:
pattern extracting means for extracting image data for the print pattern from the data of the result of the image capturing sent from the image capturing device, and calculating at least one of a density, hue, and width of lines of the print pattern;
obtaining means for obtaining, from a storage device, (i) first output pattern data that is data for use in printing the print pattern, and (ii) reference pattern data that is used to identify the print pattern from the data of the result of image capturing performed by the image capturing device to capture the print pattern printed onto the printed material based on the first output pattern data;
determining means for determining a matching level between the reference pattern data obtained by the obtaining means and at least one of the density, hue, and width of lines of the print pattern calculated by the pattern extracting means so as to determine whether the matching level is less than a predetermined threshold; and
modifying means for modifying at least one of the density, hue, and width of lines of the first output pattern data which is for use in printing the print pattern and is stored in the storage device if the determining means determines that the matching level is less than the predetermined threshold such that the print pattern is printed at a higher density, in a different hue, or with thicker lines.

2. The managing device of claim 1, further comprising first output means for outputting the first output pattern data modified by the modifying means to the print processing device providing the print pattern onto paper based on the first output pattern data.

3. The managing device of claim 1, further comprising:
recording means for recording, in the storage device as matching level history information, a matching level between the reference pattern data and the data of the result of image capturing for which the determining means determines that the matching level is greater than or equal to the predetermined threshold; and
comparison means for comparing the matching level between the reference pattern data and the data of the result of the image capturing to the matching level history information,
wherein the modifying means modifies the first output pattern data based on a result of comparison by the comparison means.

4. The managing device of claim 1 provided to a print processing device including multiple paper trays containing paper onto which the print pattern will be provided,
wherein the modifying means modifies the first output pattern data in accordance with the paper trays.

5. The managing device of claim 4, further comprising specification means for specifying one of the paper trays which contains paper onto which the print pattern will be provided,
wherein when the first output means outputs the output pattern data, the specification means specifies a predetermined paper tray.

6. The managing device of claim 4, wherein:
the storage device stores in advance paper tray information specifying a paper tray containing paper onto which the print patterns will be provided in a test printing where the data of the result of image capturing performed by the image capturing device to capture the print patterns is examined;
the managing device further comprises:
input means for receiving print paper tray specifying information specifying, when the print patterns are to be provided onto a printed material, a paper tray containing paper onto which the print patterns will be provided; and
paper tray determining means for comparing the print paper tray specifying information received by the input means to the paper tray information contained in the storage device and determining whether the print paper tray specifying information matches with the paper tray information;
the paper tray determining means outputs information indicating an alert if the paper tray determining means determines that the print paper tray specifying information does not match with the paper tray information.

7. A print processing system, comprising:
a print processing device for providing a print pattern onto a printed material based on first output pattern data for use in printing the print pattern to provide the print pattern on the printed material, the print pattern being constituted by one or more symbols and being associated with information on a predetermined control of a print process on the print processing device;
an image capturing device for capturing the print pattern; and
a managing device for managing data of a result of image capturing performed by the image capturing device so as to capture the print pattern
the managing device comprising:
a pattern extracting section for extracting image data for the print pattern from the data of the result of the image capturing sent from the image capturing device, and calculating at least one of a density, hue, and width of lines of the print pattern;
an obtaining section for obtaining, from a storage device, (i) reference pattern data which is used for identifying the print pattern, and (ii) the first output pattern data;
a determining section for determining a matching level between the reference pattern data obtained by the obtaining section and at least one of the density, hue, and width of lines of the print pattern calculated by the pattern extracting section so as to determine whether the matching level is less than a predetermined threshold; and
a modifying section for modifying at least one of the density, hue, and width of lines of the first output pattern data if the determining section determines that the matching level is less than the predetermined threshold such that the print pattern is printed at a higher density, in a different hue, or with thicker lines.

8. A method of controlling a managing device for managing data of a result of image capturing, comprising:

the image capturing being performed by an image capturing device so as to capture a print pattern, provided onto a printed material, and the data of the result of the image capturing indicates the result of the image capturing and is sent from the image capturing device to the managing device, the print pattern being constituted by one or more symbols and being associated with information on a predetermined control of a print process on a print processing device, the method comprising the steps of:

extracting image data for the print pattern from the data of the result of the image capturing sent from the image capturing device, and calculating at least one of a density, hue, and width of lines of the print pattern;

obtaining, from a storage device, (i) reference pattern data which is used in identifying the print pattern from the data of the result of image capturing performed by the image capturing device to capture the print pattern based on the first output pattern data, and (ii) the first output pattern data that is data for use in printing the print pattern;

determining a matching level between the reference pattern data obtained in the obtaining step and at least one of the density, hue, and width of lines of the print pattern calculated in the extracting step so as to determine whether the matching level is less than a predetermined threshold; and modifying at least one of the density, hue, and width of lines of the first output pattern data which is for use in printing the print pattern and is stored in the storage device if it is determined that the matching level is less than the predetermined threshold such that the print pattern is printed at a higher density, in a different hue, or with thicker lines.

9. A non-transitory computer-readable storage medium containing a computer program for controlling a managing device so that the managing device is operable, comprising:

the managing device managing data of a result of image capturing, the image capturing being performed by an image capturing device so as to capture a print pattern, provided onto a printed material, and the data of the result of the image capturing indicates the result of the image capturing and is sent from the image capturing device to the managing device, the print pattern being constituted by one or more symbols and being associated with information on a predetermined control of a print process on a print processing device, the managing device comprising:

a pattern extracting section for extracting image data for the print pattern from the data of the result of the image capturing sent from the image capturing device, and calculating at least one of a density, hue, and width of lines of the print pattern;

an obtaining section for obtaining, from a storage device, (i) first output pattern data that is data for use in printing the print pattern, and (ii) reference pattern data that is used to identify the print pattern from the data of the result of image capturing performed by the image capturing device to capture the print pattern printed onto the printed material based on the first output pattern data;

a determining section for determining a matching level between the reference pattern data obtained by the obtaining section and at least one of the density, hue, and width of lines of the print pattern calculated by the pattern extracting section so as to determine whether the matching level is less than a predetermined threshold; and a modifying section for modifying at least one of the shape, density, hue, and width of lines of the first output pattern data which is for use in printing the print pattern and is stored in the storage device if the determining section determines that the matching level is less than the predetermined threshold such that the print pattern is printed at a higher density, in a different hue, or with thicker lines, and the program causing a computer to function as those sections.

* * * * *